(12) United States Patent
Treger

(10) Patent No.: US 11,811,064 B2
(45) Date of Patent: Nov. 7, 2023

(54) DRY MILLING ADDITIVE AND PROCESS

(71) Applicant: CAMX Power, LLC, Lexington, MA (US)

(72) Inventor: Jack Treger, Quincy, MA (US)

(73) Assignee: CAMX Power LLC, Lexington, MA (US)

( * ) Notice: Subject to any disclaimer, the term of this patent is extended or adjusted under 35 U.S.C. 154(b) by 44 days.

(21) Appl. No.: 17/261,940

(22) PCT Filed: Jul. 24, 2018

(86) PCT No.: PCT/US2018/043370
§ 371 (c)(1),
(2) Date: Jan. 21, 2021

(87) PCT Pub. No.: WO2020/023017
PCT Pub. Date: Jan. 30, 2020

(65) Prior Publication Data
US 2021/0167390 A1    Jun. 3, 2021

(51) Int. Cl.
| | |
|---|---|
| *H01M 4/62* | (2006.01) |
| *H01M 4/485* | (2010.01) |
| *H01M 4/505* | (2010.01) |
| *H01M 4/525* | (2010.01) |
| *H01M 4/58* | (2010.01) |
| *B02C 17/20* | (2006.01) |

(52) U.S. Cl.
CPC ............ *H01M 4/622* (2013.01); *B02C 17/20* (2013.01); *H01M 4/485* (2013.01); *H01M 4/505* (2013.01); *H01M 4/525* (2013.01); *H01M 4/5825* (2013.01)

(58) Field of Classification Search
None
See application file for complete search history.

(56) References Cited

U.S. PATENT DOCUMENTS

| | | |
|---|---|---|
| 2004/0018135 A1 | 1/2004 | Adamson et al. |
| 2012/0138867 A1* | 6/2012 | Liang ............... H01M 4/049 252/507 |
| 2013/0134948 A1 | 5/2013 | Licht |
| 2013/0236784 A1 | 9/2013 | Lin et al. |
| 2014/0246398 A1* | 9/2014 | Zaghib ............. H01M 4/483 216/13 |
| 2016/0133936 A1* | 5/2016 | Cao ................. H01M 4/134 252/507 |

FOREIGN PATENT DOCUMENTS

| | | |
|---|---|---|
| JP | 2012195156 A * | 10/2012 |
| WO | 2007/082299 A2 | 7/2007 |
| WO | 2014/145813 A1 | 9/2014 |
| WO | 2015/047874 A1 | 4/2015 |
| WO | 2017/189887 A1 | 11/2017 |

OTHER PUBLICATIONS

Britannica, The Editors of Encyclopeadia. "abietic acid". Encyclopedia Britannica (Year: 2015).*

* cited by examiner

*Primary Examiner* — Tanisha Diggs
(74) *Attorney, Agent, or Firm* — Dinsmore & Shohl LLP; Weston R. Gould

(57) ABSTRACT

Provided are processes of preventing or eliminating caking of particulate materials during milling operations. Processes include the addition of an anti-caking additive such as a rosin, abietic acid, fatty acid, or derivative of any of the foregoing to a mill prior to or along with a particulate chemical, and milling the combination. The addition of the anti-caking additive prevents or reduces the amount of caking observed thereby increasing yields and maintaining or enhancing the resulting properties of the milled product.

14 Claims, 11 Drawing Sheets

DRY MILLING ADDITIVE AND PROCESS

STATEMENT OF GOVERNMENT SPONSORSHIP

This invention was made with government support under grant no. W911QX-15-C-0020, awarded by the Department of the Army. The government has certain rights in the invention.

FIELD

This disclosure relates to a dry milling additive and dry milling process that prevents caking or coating of process media and vessel by chemical powders, facilitating high intensity dry milling of chemical powders and achieving intimate mixing and particle size reduction of the chemical powders.

The invention further relates to a method of dry milling electrochemical precursors and to electrochemical cells produced using electrochemical materials derived from the precursors.

BACKGROUND

Electrochemically active compounds (EAC), such as lithium metal phosphates (e.g., $LiFePO_4$, $LiCo_{0.85}Fe_{0.15}PO_4$), lithium metal oxides (e.g., $LiMn_{1.5}Ni_{0.5}O_4$), and titanium niobium oxide (e.g., $TiNb_2O_7$) are materials that may be used in the anode or cathode of electrochemical cells such as batteries. EAC may be produced by calcining a well dispersed mixture of their precursors (EAC-P), otherwise known as solid-state calcining. Optionally, prior to calcination, EAC-P can be pelletized under pressure to assist formation of the EAC by decreasing the diffusion distances of the atoms. EAC formation can be further enhanced by utilizing a homogenous and small particle size EAC-P.

Dry or wet milling can be used to produce a homogenous and small particle size EAC-P. In dry milling the chemical precursors are mixed together and crushed, generally with grinding media such as metal or ceramic balls in a vessel such as a rotating jar mill or a high energy shaker vessel such as a Spex mill. Other types of media mills can include planetary mills, rod mills, pebble mills and stirred media mills. The milling vessels and milling media can be constructed from hard materials such as stainless steel, hardened steel, tungsten carbide, agate, alumina, zirconium silicate and zirconia. During milling, the precursor is distributed between the impacting milling media and between the milling media and vessel walls. Impact energy fractures, crushes and mixes the EAC-P resulting in size reduction and uniform particle distribution. Efficient milling creates small particle size and uniform material distribution and can promote formation, crystallization and phase purity of the EAC during calcination by diminishing the diffusion distance of the atoms and insuring a homogenous distribution of the thermally reactive atoms.

Efficient milling requires a hard and clean media and wall surface to insure maximum transfer of fracturing and distribution energy to the EAC-P. If the media and/or vessel wall becomes coated with precursor material (i.e. caking) then milling efficiency is decreased because the adhered caked material becomes a media shock absorber and diminishes high energy impact of the media with the precursor powder. Another problem that can arise with caking is self-adherence of the EAC-P powder into a packed bed that adheres to the vessel walls and isolates the bulk of the EAC-P from the milling media, preventing further powder fracturing and mixing. Thus, it is desirable to minimize caking to achieve efficient and complete EAC-P milling.

One method of preventing EAC-P caking is wet milling. In wet milling the media and EAC-P are milled in a liquid medium. The liquid medium keeps the EAC-P dispersed, prevents caking and can produce a well dispersed and small particle size EAC-P. It is desirable for the EAC-P to be insoluble in and non-reactive with the liquid medium. Liquid medium can include water, alcohol, heptane, xylene and methyl ethyl ketone. The disadvantage of wet milling is the added cost and added manufacturing steps of using a liquid medium which include separating the EAC-P from the liquid and drying the EAC-P.

Given the cost associated with wet milling and the caking issues that are common with dry milling, new methods of milling particulate chemical materials are needed.

SUMMARY

Figure 1:
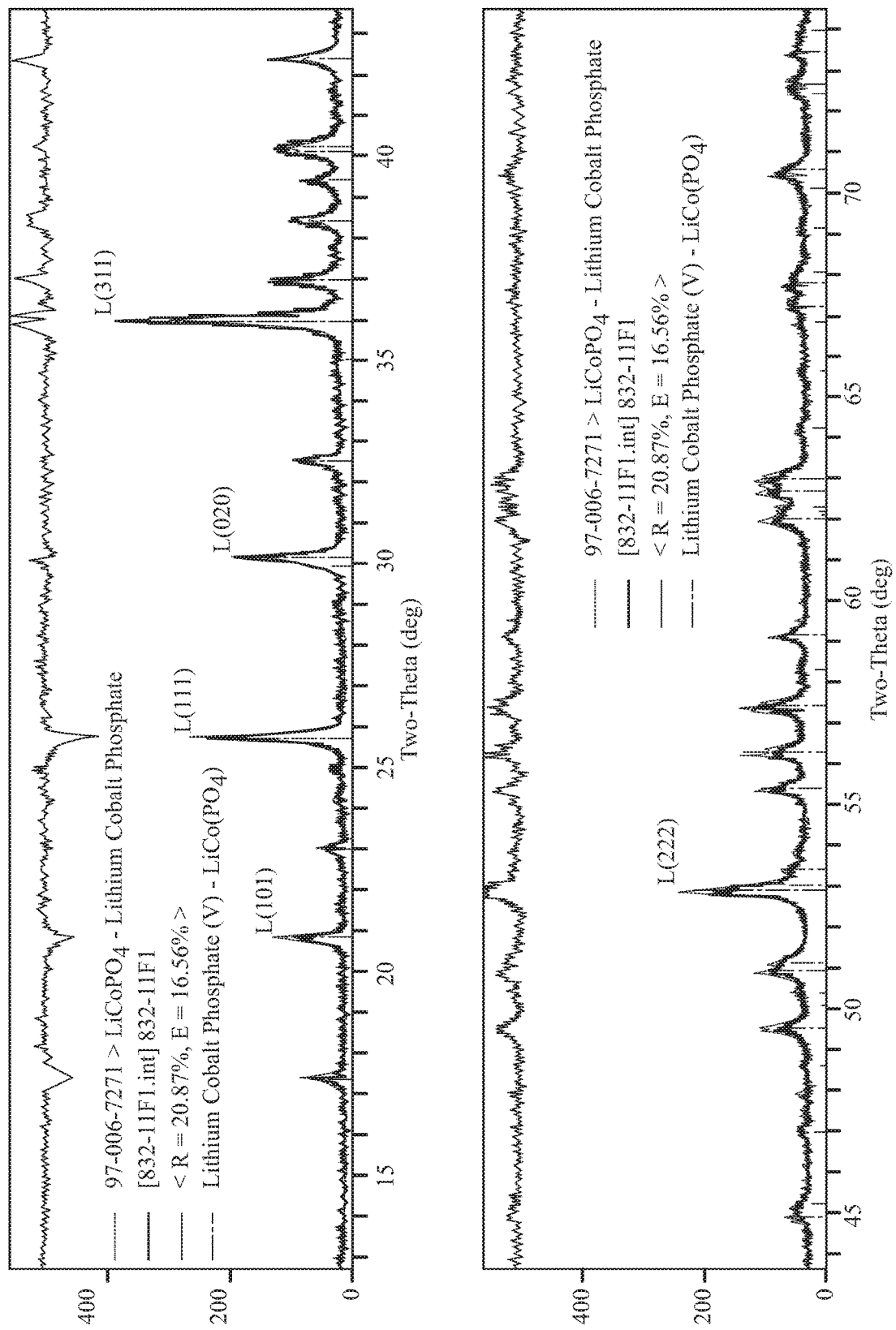
FIG. 1 is a powder XRD Pattern of $LiCo_{0.85}Fe_{0.15}PO_4$ produced using gum rosin milling additive in spex mill.

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

One objective of the present disclosure is to use an anti-caking additive that is more effective than the prior art additives or that surprisingly functions at different relative amounts and promotes more efficient dry milling of powders, optionally EAC-P.

In some aspects, an anti-caking additive can be either substantially removed by oxidation or volatilization during a subsequent EAC-P calcination process or else converted into a compound that is not detrimental to the performance or safety of an electrochemical cell employing an active material milled in the presence of the anti-caking additive.

Another objective of the present disclosure is to use an anti-caking additive in a solid state post-processing of EAC materials. Such processing can include coating EAC materials with an ionically conductive coating precursor (ICIC-P), followed by calcination to an ionically conductive coating (ICIC) coated EAC that can enhance EAC cycle life, EAC thermal stability or decrease EAC gassing during normal cell operation.

It has been surprisingly found that rosin, particularly gum rosin, is a highly effective anti-caking additive that can be used in the milling of chemical powders and EAC-P and substantially prevents media and vessel wall caking during precursor milling.

The rosin or other anti-caking additive as provided herein can be pre-dispersed onto the media and vessel or added along with the chemical powder(s) or EAC-P and subsequently milled.

During solid-state calcination of EAC-P following milling, the rosin volatizes or oxidizes to gaseous products and removes itself from the final product.

DETAILED DESCRIPTION

The following description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Provided herein are methods of dry milling particulate materials such that caking is prevented or reduced by the addition of one or more anti-caking additives. In particular aspects of the disclosure the anti-caking additives are used to dry mill precursors of or electrochemically active materials and wherein the anti-caking additive is either volatilized during a subsequent calcination step such that the anti-caking additive is removed from the final product or is present in amounts that are not significantly detrimental to the electrochemical activity of an electrochemical cell employing the material. In other aspects, the amount of or nature of the anti-caking additive is such that electrochemical performance of a cell employing materials formed by the provided processes are not significantly negatively affected by the presence of the anti-caking additive.

Among the large number of possible additives to reduce or eliminate caking during dry milling processes, it was surprisingly found that Rosin virtually eliminated caking of electrochemically active compounds (EAC) during dry milling processes. As a result it was discovered that the use of rosin as a milling additive can improve the chemical purity of EAC as well as increase the electrochemical capacity and/or rate capability of EAC materials versus using no milling additive.

Rosin is a solid form of resin obtained from the oleo-resin exudate of pines and other conifers, produced by heating fresh liquid oleo-resin to vaporize and remove the volatile liquid terpene components. Rosin comprises various organic resin carboxylic acids, and in particular abietic acid.

In some aspects, a rosin is a rosin derivative. A rosin derivative is a chemically modified rosin that maintains the anti-caking properties of the rosin, but may impart other or improved characteristics. A rosin derivative is optionally a rosin that has been hydrogenated, esterified, or both. Chemically modified rosin such as rosin soap can also be used as an effective anti-caking additive. Rosinate or pinate soap can be made by reacting a rosin solution with an alkali such as lithium hydroxide or ammonium hydroxide. Ammonium hydroxide can also produce a rosin soap that will substantially volatize during the subsequent precursor calcination leaving practically no residue. Optionally, an alkali rosin is an alkali rosinate or pinate soap wherein the alkali cation is ammonium, lithium, sodium, potassium, rubidium, or cesium.

Optionally a rosin derivative is an esterified rosin. Esterification can alter the softening temperature of the rosin. The carboxylic acid of the rosin can be modified to an ester by reaction with one or more alcohols such as methanol, triethylene glycol, glycerol, or pantaeythritol, each by mechanisms recognized in the art. Illustrative examples of esterified rosins include ABALYN and PEXALYN from Pinova.

Optionally a rosin derivative is a hydrogenated rosin. Hydrogenating rosin imparts improved stability and resistance to oxidation to the resulting rosin derivative. A rosin derivative is optionally partially hydrogenated or highly hydrogenated. Illustrative examples of partially hydrogenated rosins include STAYBELITE or STAYBELITE A from Pinova. Illustrative examples of highly hydrogenated rosin include the FORAL line of resins from Pinova.

In some aspects a resin is a dimerized resin. While resin molecules are able to dimerize, greater multimers of the rosins are typically unable to form due to steric hindrance. As such, a rosin derivative is optionally a resin dimer. An illustrative example of a rosin dimer is Poly-Pale™ partially dimerized rosin from Eastman Chemical Company.

Optionally, a rosin derivative is an otherwise modified rosin. Optionally, a rosin derivative is a rosin that has been modified by reaction with a desired molecule, optionally reaction with fumaric acid, maleic anhydride, or pimeric acid.

Specific illustrative examples of rosin derivatives that are useful as anti-caking additives include rosins that have varying degrees of hydrogenation and esterification such as those manufactured by Pinova under the name of ABALYN, PENTALYNE, PEXALYNE, PINOVA, FORAL, HERCOLYN, STAYBELITE, and ENDERE.

In other aspects, an anti-caking additive is a component of a rosin. It was found that abietic acid a primary component of resin can serve as an excellent anti-caking additive. As such, in some aspects an anti-caking additive is abietic acid or an abietic acid derivative. An abietic acid derivative is optionally a hydrogenated abietic acid, and esterified abietic acid, a dimerized abietic acid, an otherwise modified abietic acid, or a combination thereof. Illustrative examples of hydrogenated abietic acid include dihydroabietic acid and tetrahydroabietic acid. Illustrative examples esterified abietic acid include those esterified with one or more of methanol, triethylene glycol, glycerol, or pantaeythritol. An otherwise modified abietic acid is optionally a abietic acid modified by reaction with one or more of fumaric acid, maleic anhydride, or pimeric acid. Optionally, an abietic acid derivative is an abietic salt of ammonium, lithium, sodium, potassium, rubidium, or cesium.

In some aspects, an anti-caking additive is optionally a fatty acid or fatty acid derivative. A fatty acid includes a hydrocarbon chain terminated in a carboxylic acid. A hydrocarbon chain is optionally saturated or unsaturated. Unsaturated hydrocarbon chains are optionally monounsaturated or multiply unsaturated. Optionally, a hydrocarbon is unsaturated at 1, 2, 3, 4, or more sites. A hydrocarbon chain optionally includes 4-20 carbon atoms in either linear or branched configuration. Optionally, a hydrocarbon chain includes 10-20 carbon atoms, optionally 15-20 carbon atoms. As such, a hydrocarbon chain optionally is a C4-C20 alkyl, alkenyl, or alkynyl radical that is or is not substituted at one or more sites with one or more of O, N, S, or P. Optionally, a hydrocarbon chain is a C4-C20 alkyl, alkenyl, or alkynyl that further includes one or more substituents comprising O, N, S, or P. Illustrative specific examples of a fatty acid used as an anti-caking additive include stearic acid or oleic acid. A fatty acid is optionally a triglyceride of stearic acid or oleic acid, or other fatty acid as provided herein.

While not wanting to be bound by any theory, it is believed the anti-caking additive is strongly absorbed to inorganic surfaces and prevents adherence of particulate chemical, optionally EAC-P, to the milling media, vessel wall, and optionally to itself to a desirable degree.

The amount of anti-caking additive, particularly with respect to fatty acid anti-caking additives, used in a batch of precursor milling can affect the efficiency of milling. There should be enough anti-caking additive present to coat the surface of the media and vessel walls with at least a molecular monolayer of anti-caking additive. The most effective amount of anti-caking additive used is dependent upon the surface area of the precursor, media, vessel walls, and identity of the anti-caking additive. The amount of anti-caking additive used can be greater than approximately 0.01% w/w and less than approximately 20% w/w of the total amount of precursor, optionally greater than 0.1% w/w and less than 5% w/w of the precursor. When an anti-caking additive is a fatty acid, it is appreciated that the amount of anti-caking additive is greater than 1% w/w, optionally greater than 2% w/w, optionally greater than 3% w/w, optionally greater than 4% w/w, optionally greater than 5% w/w, optionally greater than 6% w/w, optionally greater than 7% w/w, optionally greater than 8% w/w, optionally greater than 9% w/w, optionally greater than 10% w/w.

The order of addition of the anti-caking additive can affect the efficiency of precursor milling. In some aspects, the anti-caking additive is added first then milled for a pre-milling time, for example less than 5 minutes depending on the type of mill used. This will cover the media and vessel walls with a portion of the anti-caking additive. After the anti-caking additive is distributed in the mill the particulate chemical(s) for dry milling, optionally EAC-P, is next added and milling is resumed. Alternatively, the anti-caking additive and particulate chemical can be added to the mill in one step followed by milling.

The milling time of the particulate chemical is dependent upon the desired degree of particle size reduction, type of media and mill used, the media and mill vessel composition, and amount of milling energy imparted. Generally, the particulate chemical milling time can be more than 5 minutes and less than 48 hours or any value or range therebetween. Optionally, the milling time is more than 10 minutes and less than 2 hours.

Milling is performed in a mill that includes one or more milling vessels. A suitable mill is optionally a rotating mill, shaker mill, spex mill, planetary mill, jar mill, pebble mill, or stirred media mill, although other milling devices may be sued as well. Any milling vessel recognized in the art as useful for milling particulate materials may be used. Optionally, a milling vessel is formed of a material such as stainless steel, hardened steel, tungsten carbide, agate, alumina, zirconia, or a combination thereof.

A process of milling particulate materials requires the use of milling media present within the milling vessel during the milling process. Milling media may be any milling media recognized in the art. Optionally, a milling media is in the shape of a sphere or other desired shape. Milling media is optionally formed from a material such as stainless steel, hardened steel, tungsten carbide, agate, alumina, zirconia, or a combination thereof.

The precursor material milled in the provided processes is optionally any particulate chemical that is in need of milling. Optionally, a particulate chemical is useful in an electrochemical cell, capacitor, solid electrolyte, catalysts, phosphor, or other desired uses. In some aspects, a particulate chemical is or includes one or more electrochemically active compounds (EAC). An electrically active compound is capable of reversibly absorbing and desorbing an ion, optionally lithium, hydrogen, or other.

Illustrative non-limiting examples of particulate chemicals that may be used in the provided processes include metal oxides, metal halides, metal fluorides, metal hydroxides, metal carbonates, metal hydroxide carbonates, metal sulfates, metal nitrates, metal borates, metal vanadates, metal zirconates, metal titanates, metal phosphates, metal chromates, metal oxalates, metal salts of carboxylic acids, organometallics, metal monohydrogen phosphates, metal dihydrogen phosphates, ammonium phosphate, ammonium monohydrogen phosphate, ammonium dihydrogen phosphate, lithium phosphate, lithium monohydrogen phosphate, lithium dihydrogen phosphate, non-metal phosphates, non-metal monohydrogen phosphates, non-metal dihydrogen phosphates, carbon, graphite, graphene, glucose, sucrose, maltose, and mixtures thereof.

In some aspects, two or more chemically different types of particulate chemicals may be milled sequentially or simultaneously. Optionally, 1, 2, 3, 4, 5, 6, 7, or more chemically different particulate chemicals may be used in the provided processes. In some aspects, a first particulate chemical is an EAC. Optionally, a second particulate chemical is a second EAC.

Optionally, a second particulate chemical is an ionically conductive coating precursor (ICIC-P) that can be thermally converted into an ionically conductive coating (ICIC) and enhance the electrochemical and thermal stability of EAC during normal electrochemical cell operation. ICIC can also improve thermal safety of EAC in the event of a short circuit by inhibiting or mitigating thermal reaction of the EAC with electrolyte. ICIC can have high Li ion conductivity, for example greater than 10'S/cm or greater than 10 S/cm or greater than 10-S/cm and can be electrochemically inert across the voltage range of various cathodes (2.0V-5.1V). Examples of ICIC can include lithium phosphate, aluminum phosphate and zirconium phosphate. Other ICIC examples include superionic solid-state electrolytes based on LISICON, NASICON, perovskite or garnet type oxides including lithium aluminum titanium phosphate, lithium lanthanum tantalum oxide, lithium lanthanum titanate, lithium aluminum germanium phosphate and lithium lanthanum zirconium oxide. The ICIC metals can include zirconium, lanthanum, aluminum, lithium, titanium, germanium and tantalum. Other ICIC superionic solid-state electrolytes include thio-LISICON type compounds including $Li_{3.25}Ge_{0.25}P_{0.75}S_4$, $Li_7P_3S_{11}$, and $Li_{10}GeP_2S_{12}$. Other ICIC examples include lithium titanium oxide and niobium titanium oxide.

Following milling the milled product comprising anti-caking additive and the precursors can be pelletized under pressure to facilitate formation and crystalline purity of the final product by decreasing the thermally induced diffusion distance of the atoms.

Figure 10:
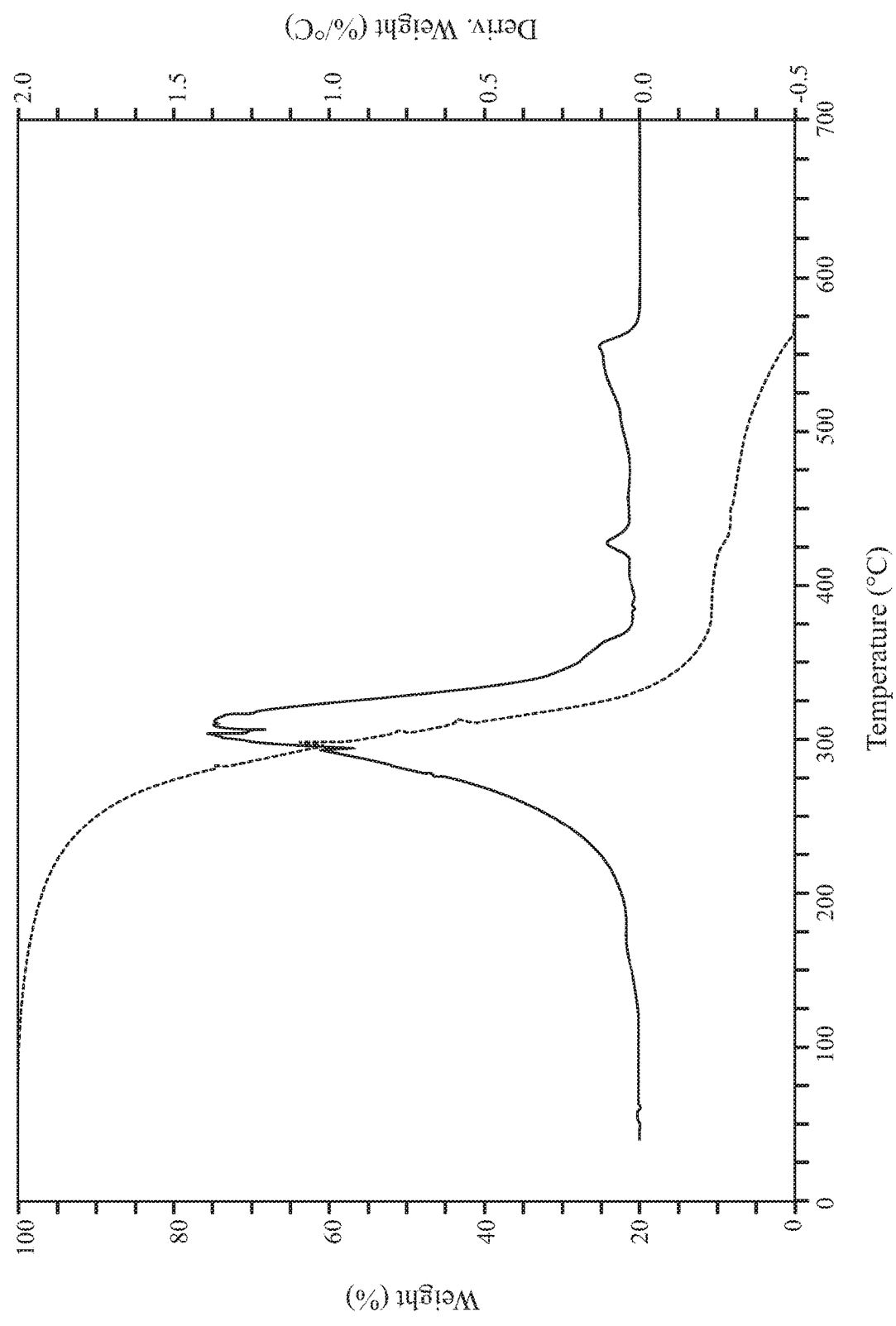
FIG. 10 illustrates a thermogravimetric analysis of gum rosin heated in air.
Figure 11:
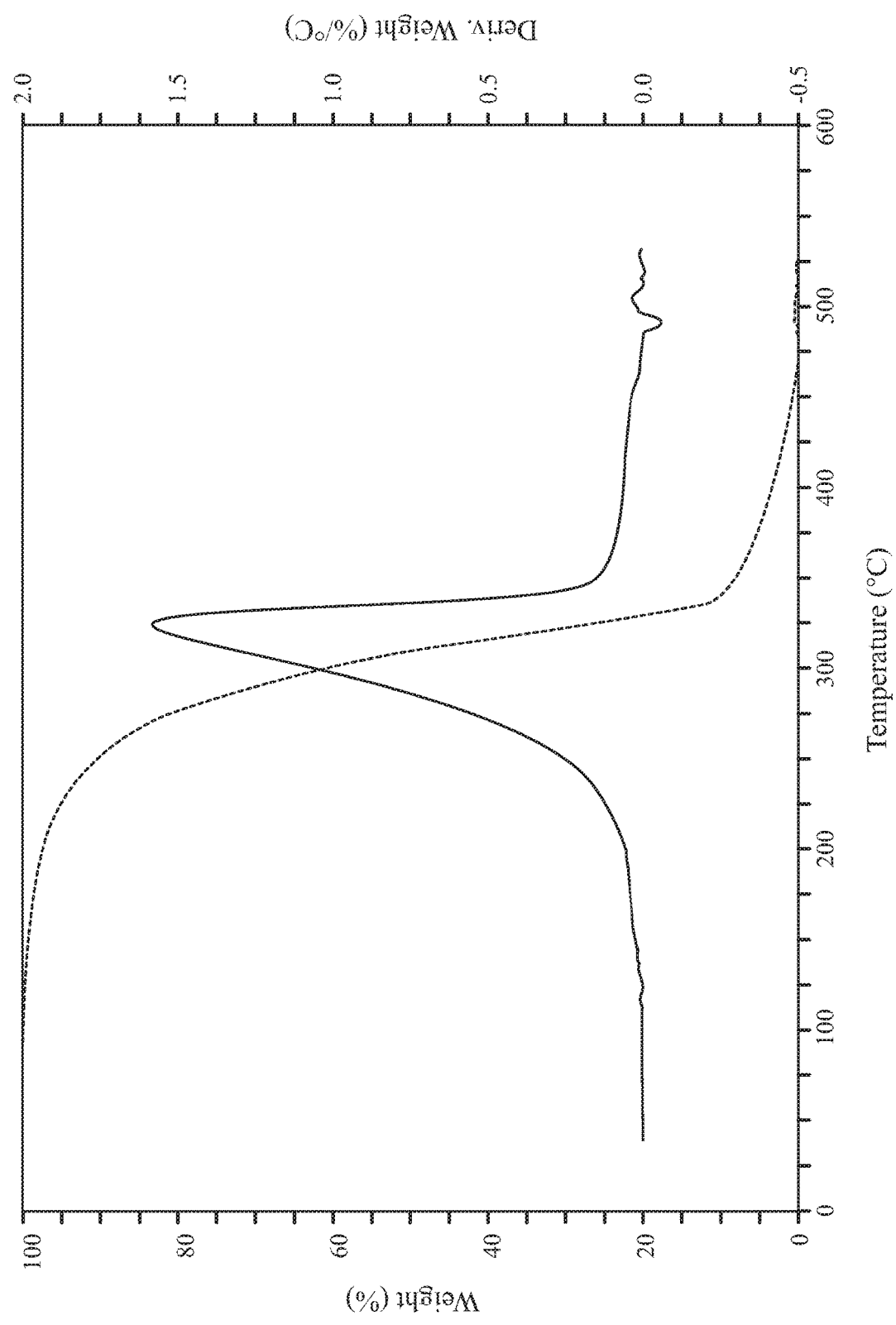
FIG. 11 illustrates a thermogravimetric analysis of gum rosin heated in argon.

For many electrochemically active materials as exemplary milled products, the milled products are optionally subjected to a high temperature calcination. Optionally, the calcination formation temperature can be higher than 500° C., for example higher than 600° C., or higher than 700° C. Rosins as exemplary anti-caking additives are volatile and/or oxidize below 600° C. For example, more than 95% and 99% of gum rosin is volatized or oxidized above 500° C. and 600° C. respectively either in air or argon, so they practically remove themselves below the temperature of formation of the electrochemically active product (FIGS. 10 and 11).

Anti-caking additives can also be used to prevent media and vessel caking during the dry milling processing of ICIC-P coated EAC and improve the homogeneity and uniformity of the ICIC-P coating on the surface of the EAC. The ICIC-P is subsequently converted into a ICIC by calcination resulting in a ICIC coated EAC.

Various aspects of the present invention are illustrated by the following non-limiting examples. The examples are for illustrative purposes and are not a limitation on any practice of the present invention. It will be understood that variations and modifications can be made without departing from the spirit and scope of the invention. While the examples are generally directed to electrochemically active materials, a person having ordinary skill in the art recognizes that similar techniques and other techniques known in the art readily translate the examples to other particulate chemicals that are suitable for or in need of milling reactions. Reagents illustrated herein are commercially available, and a person of ordinary skill in the art readily understands where such reagents may be obtained.

EXAMPLES

Example 1—$LiCo_{0.85}Fe_{0.15}PO_4$ Produced Using Gum Rosin Milling Additive in Spex Mill 0.4 grams of gum rosin (Aldrich 60895) and 20 grams of ¼ inch chrome plated steel media balls are added to a Spex 8006 Sample Prep Vial and Spex milled for 3 minutes. 4.83 grams of $LiH_2PO_4$, 3.62 grams of $Co(OH)_2$, 0.81 grams of Iron(2) oxalate, 0.17 grams of $Cr_2O_3$ and 0.36 grams of acetylene black are added to the vial and Spex milled for 20 minutes. Following milling it was observed that the media and Spex vial walls were practically free of powder and the milled powder had a fine dry free flowing consistency resembling talcum powder. 5 grams of the powder was pelletized in a 1 inch diameter pellet die using 11 tons pressure. The pellet was calcined in a tube furnace under argon atmosphere by heating from room temperature to 700° C. at 10° C./min and holding at 700° C. for 12 hours followed by natural cool down. The calcined pellet was then powdered using a Spex mill and 3 chrome plated steel media balls for 5 minutes. The powder color was uniform black, and the powder was not magnetic.

A cathode slurry was prepared by mixing 85/5/10 $LiCo_{0.85}Fe_{0.85}PO_4$/Acetylene Black/Kureha 1120 PVDF binder by weight with N-methyl 2-pyrrolidone solvent using a Thinky mixer. The slurry solids is 39%. A cathode sheet is prepared by drawdown bar coating 12 mils of the slurry onto 19 μm Al foil of slurry followed by drying in air at 130° C. for 30 minutes. The cathode sheet is pressed at 50 psi twice. The $LiCo_{0.85}Fe_{0.15}PO_4$ active coating weight is 8.9 mg/cm$^2$ and the coating density is 2.1 g/cc.

CR2025 coin cell Li half cells are constructed with ⅝ in diameter cathode, 1M $LiPF_6$ EC/DMC 3/7 (2% Lithium difluoro(oxalato)borate) electrolyte, Celgard 2325 separator and ⅝ in 13 mil thick Li foil anode. The cell is charged at a rate of C/20 to 5V then discharged to 3.1V. The cell had a C/20 discharge voltage of 4.8-4.9V, a C/20 and 1C capacity of 114 and 95 mAh/g respectively and a 1a cycle efficiency of 74%.

Figure 6:
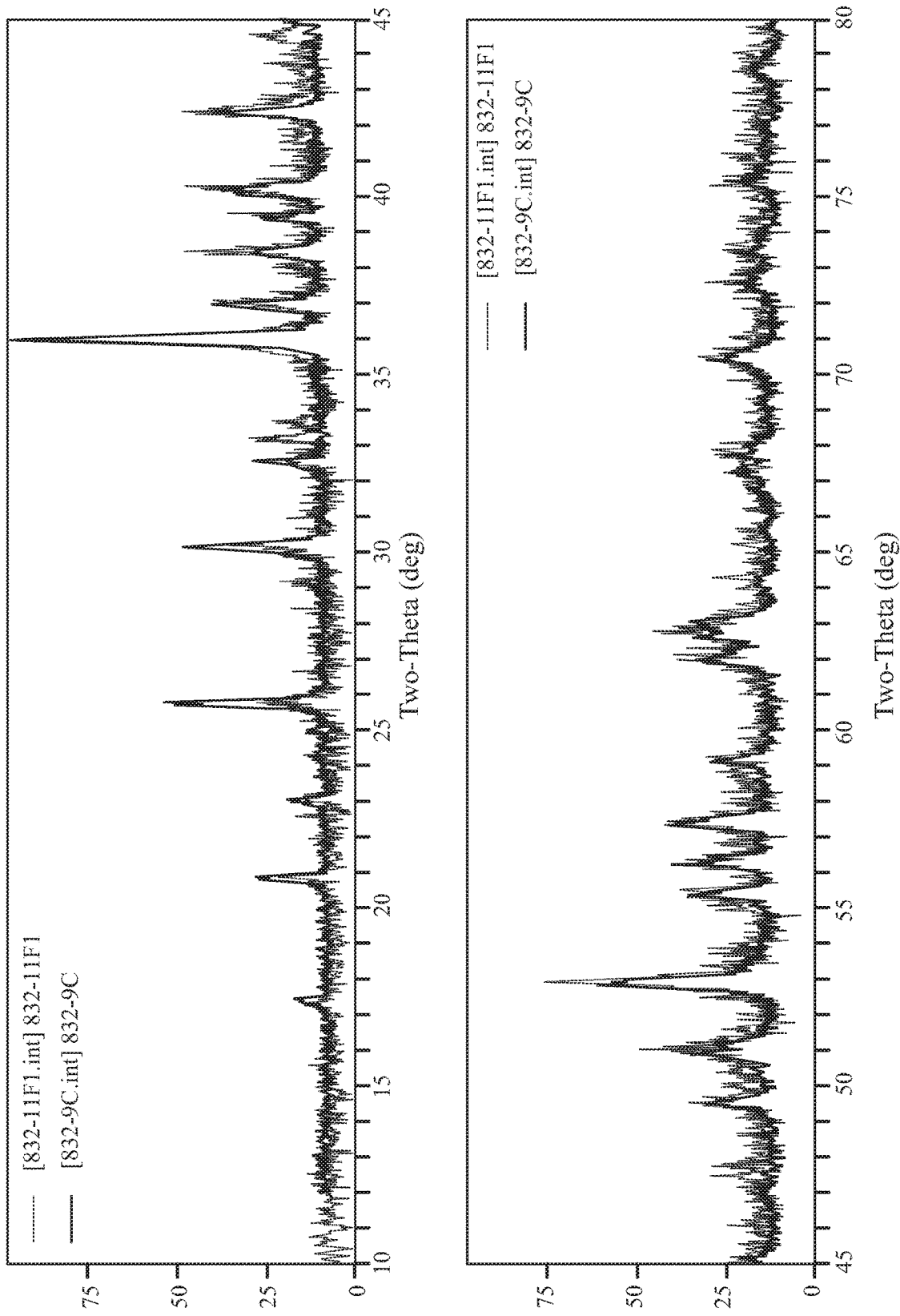
FIG. 6 is a powder XRD Pattern of $LiCo_{0.85}Fe_{0.15}PO_4$ produced in Jar Mill without milling additive (solid line) vs Spex mill with gum rosin milling additive (dashed line)

Example 2—$LiCo_{0.85}Fe_{0.15}PO_4$ Produced Using Gum Rosin Milling Additive in Spex Mill and Split Calcined 0.4 grams of gum rosin (Aldrich 60895) and 20 grams of ¼ inch chrome plated steel media balls are added to a Spex 8006 Sample Prep Vial and Spex milled for 3 minutes. 4.83 grams of $LiH_2PO_4$, 3.62 grams of $Co(OH)_2$, 0.81 grams of Iron(2) oxalate, 0.17 grams of $Cr_2O_3$ and 0.36 grams of acetylene black are added to the vial and Spex milled for 20 minutes. Following milling it was observed that the media and Spex vial walls were practically free of powder and the milled powder had a fine dry free flowing consistency resembling talcum powder. 5 grams of the powder was pelletized in a 1 inch diameter pellet die using 11 tons pressure. The pellet was calcined in a tube furnace under argon atmosphere by heating from room temperature to 750° C. at 10° C./min and holding at 750° C. for 12 hours followed by natural cool down. The calcined pellet was then powdered using a Spex mill and 3 chrome plated steel media balls for 5 minutes. The powder color was uniform black, and the powder was not magnetic. The X-Ray Powder Diffraction (XRD) pattern was obtained by coating the powder onto a zero-diffraction silicon plate and collecting the XRD data using a Shimadzu Lab-X XRD 6000. The XRD pattern is shown in FIG. 1 and matches the crystal pattern for $LiCoPO_4$. FIG. 6 is a powder XRD Pattern of $LiCo_{0.85}Fe_{0.15}PO_4$ produced in Jar Mill without milling additive (solid) vs Spex mill with gum rosin milling additive (dashed line) where it is noted that the presence of the milling additive produced results with higher crystallinity and fewer impurities.

A cathode slurry was prepared by mixing 85/5/10 $LiCo_{0.85}Fe_{0.15}PO_4$/Acetylene Black/Kureha 1120 PVDF binder by weight with N-methyl 2-pyrrolidone solvent using a Thinky mixer. The slurry solids is 39%. A cathode sheet is prepared by drawdown bar coating 12 mils of the slurry onto 19 μm Al foil of slurry followed by drying in air at 130° C. for 30 minutes. The cathode sheet is pressed at 50 psi twice. The $LiCo_{0.85}Fe_{0.15}PO_4$ active coating weight is 9 mg/cm$^2$ and the coating density is 2.1 g/cc.

CR2025 coin cell Li half cells are constructed with ⅝ in diameter cathode, 1M $LiPF_6$ EC/DMC 3/7 (2% Lithium difluoro(oxalato)borate) electrolyte, Celgard 2325 separator and ⅝ in 13 mil thick Li foil anode. The cell is charged at a rate of C/20 to 5V then discharged to 3.1V. The cell had a C/20 discharge voltage of 4.8-4.9V, a C/20 and 1C capacity of 116 and 100 mAh/g respectively and a 1$^{st}$ cycle efficiency of 74%.

Figure 2A:
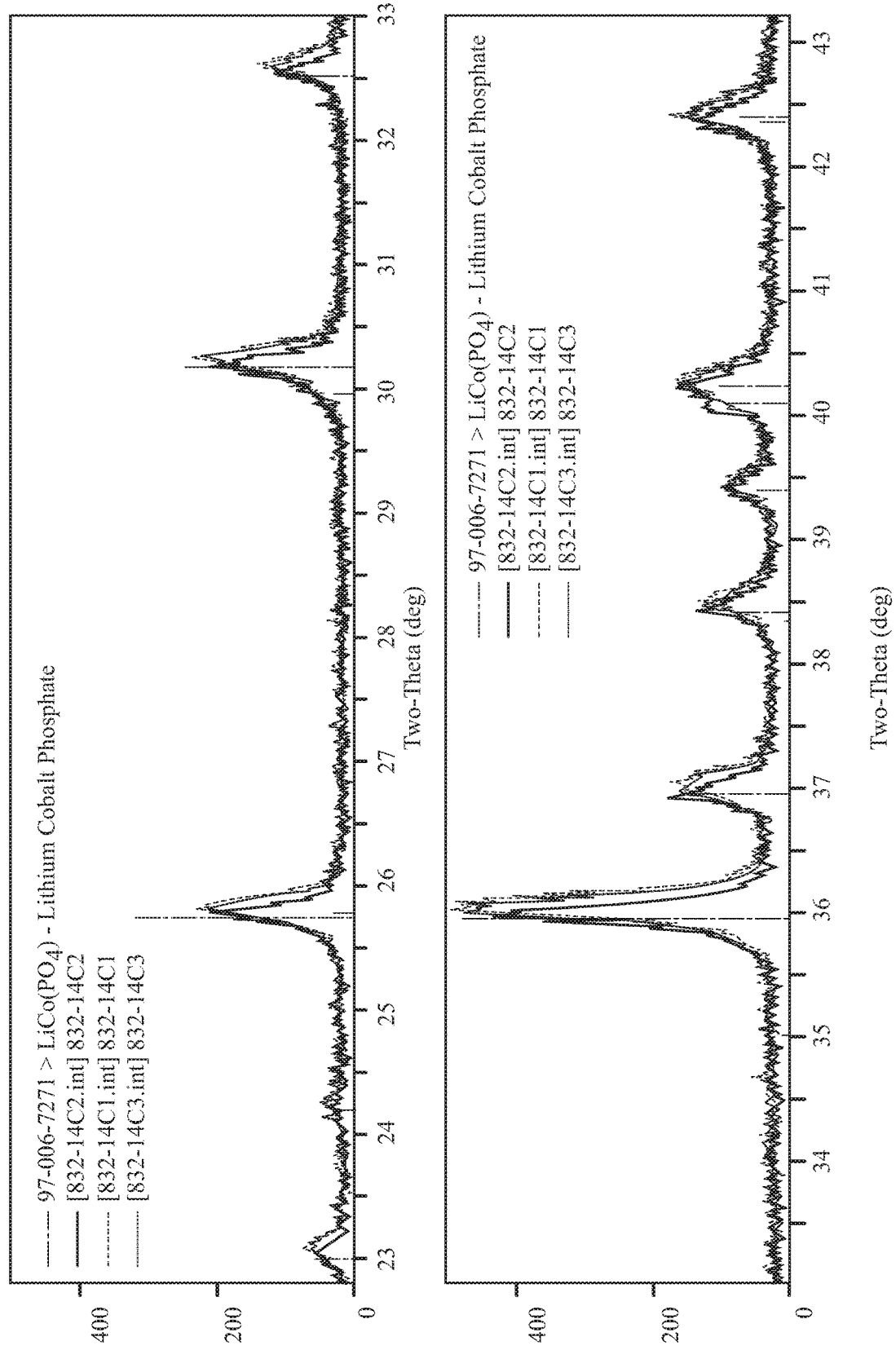
FIG. 2A is a powder XRD pattern of $LiCo_{0.85}Fe_{0.15}PO_4$ produced using gum rosin milling additive in planetary mill with split calcination.
Figure 2B:
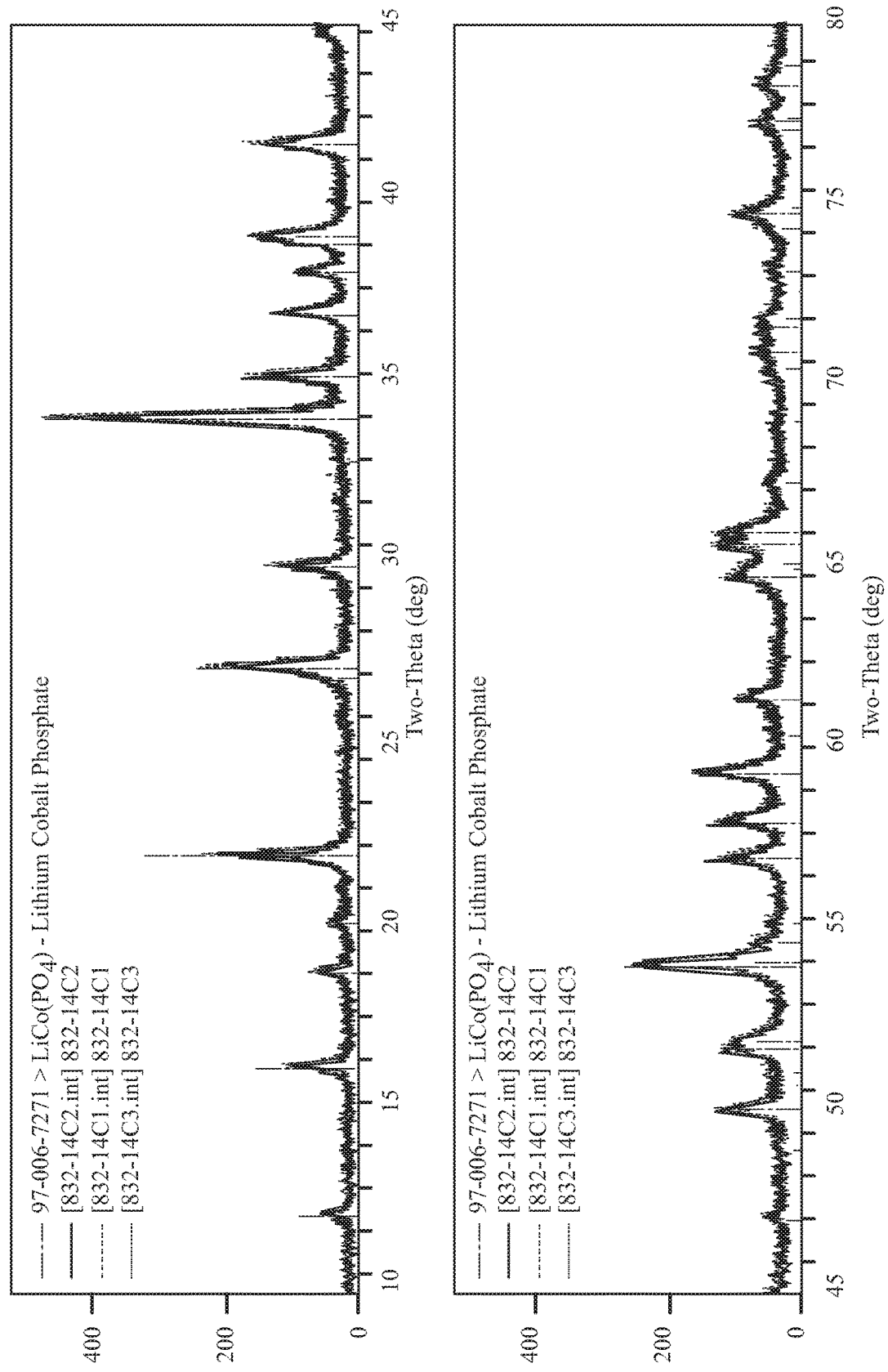
FIG. 2B is a powder XRD pattern of $LiCo_{0.85}Fe_{0.15}PO_4$ produced using gum rosin milling additive in planetary mill with split calcination.

Example 3—$LiCo_{0.85}Fe_{0.15}PO_4$ Produced Using Gum Rosin Milling Additive in Planetary Mill with Split Calcination Add 600 grams of 0.5 inch hardened steel media balls and 4 grams of gum rosin to a 500 ml hardened steel Retsch planetary mill jar. Mill at 100 rpm for 3 minutes. Add 3.6 grams acetylene black and mill at 200 rpm for 3 minutes. Add 48.3 grams $LiH_2PO_4$, 36.2 grams $Co(OH)_2$, 8.1 grams Fe(2) oxalate, and 4.8 grams Cr(3)acetate hydroxide. Mill at 300 rpm for 20 minutes. Add 1.2 gram of Si tetra-acetate and mill at 300 rpm for 10 minutes. Following milling it was observed that the media and jar wall were practically free of powder and the milled powder had a fine dry free flowing consistency resembling talcum powder. 5 grams of the powder was pelletized in a 1 inch diameter pellet die using 11 tons pressure. The pellets were calcined in a tube furnace under argon atmosphere by heating from room temperature to 800° C. at 10° C./min and holding at 800° C. for 2 hours then natural cooling to 700° C. and holding at 700° C. for 10 hours. The resulting pellet was a uniform dark grey color and nonmagnetic. The X-Ray Powder Diffraction (XRD) pattern was obtained by coating the powder onto a zero-diffraction silicon plate and collecting the XRD data using a Shimadzu Lab-X XRD 6000. The XRD pattern is shown in FIGS. 2A and 2B for three pellets at different locations in the tube furnace and matches the crystal pattern for $LiCoPO_4$. The XRD unit cell lattice parameters are A=10.207 Å, B=5.931 Å, C=4.700 Å, Volume=284.7 Å, crystallite size=2232 Å.

A cathode slurry was prepared by mixing 85/5/10 $LiCo_{0.85}Fe_{0.15}PO_4$/Acetylene Black/Kureha 1120 PVDF binder by weight with N-methyl 2-pyrrolidone solvent using a Thinky mixer. The slurry solids is 39%. A cathode sheet is prepared by drawdown bar coating 12 mils of the slurry onto 19 μm Al foil of slurry followed by drying in air at 130° C. for 30 minutes. The cathode sheet is pressed at 50 psi twice. The $LiCo_{0.85}Fe_{0.15}PO_4$ coating weight is 8.6 mg/cm$^2$ and the coating density is 2.1 g/cc.

CR2025 coin cell Li half cells are constructed with ⅝ in diameter cathode, Celgard 2325 separator, 1M $LiPF_6$ EC/DMC 3/7 (2% Lithium difluoro(oxalato)borate) electrolyte and ⅝ in 13 mil thick Li foil anode. The cell is charged at a rate of C/20 to 5V then discharged to 3.1V. The cell had a C/20 discharge voltage of 4.8-4.9V, a C/20 and 1C capacity of 118 and 104 mAh/g respectively and a 1$^{st}$ cycle efficiency of 73%.

Figure 4:
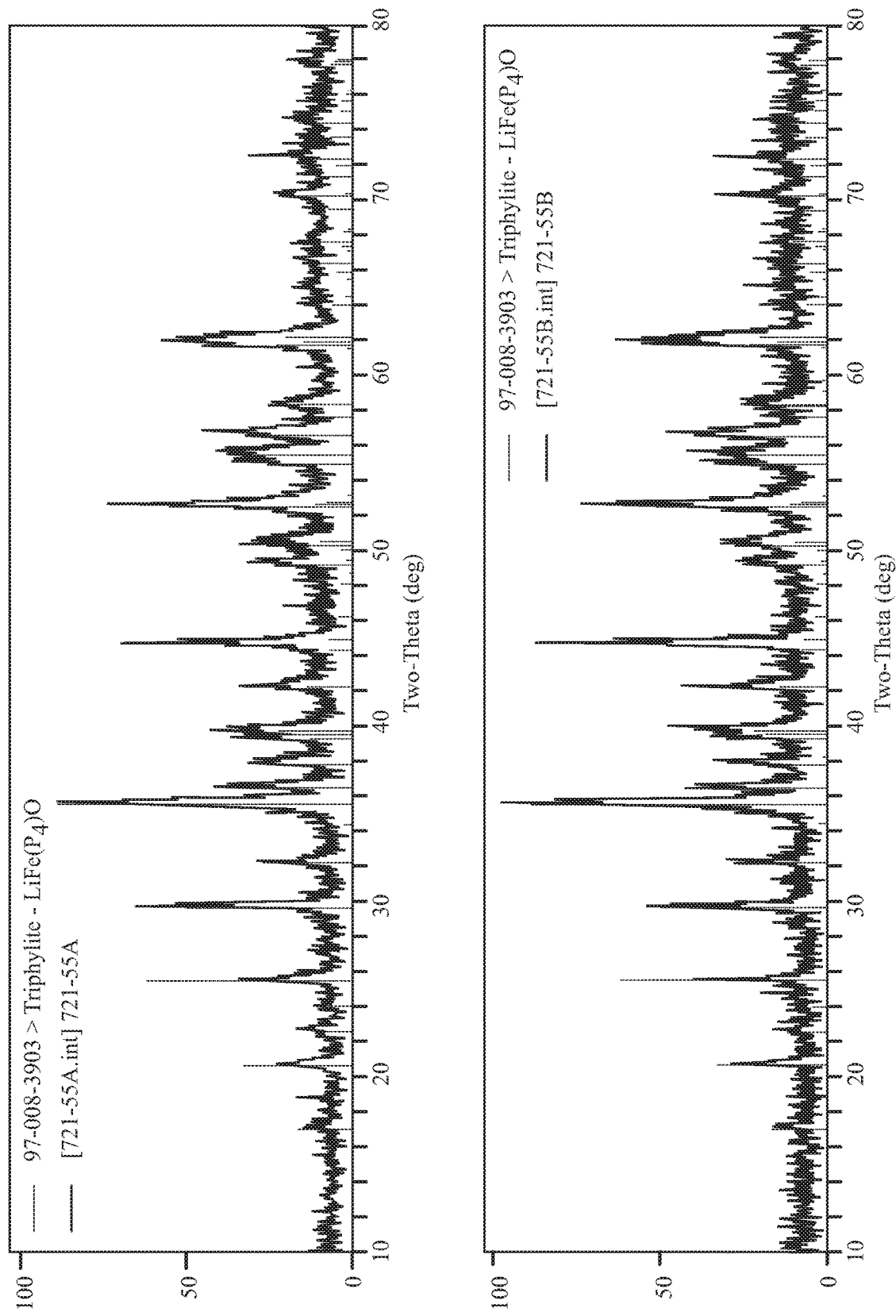
FIG. 4 is a powder XRD Pattern of $LiFePO_4$ produced using gum rosin anti-caking additive (top) and without gum rosin additive (bottom) along with $LiFePO_4$ reference lines.

Example 4—$LiFePO_4$ (3% V) Produced with Gum Rosin Milling Additive in Spex Mill 0.4 grams of gum rosin (Aldrich 60895) and 20 grams of ¼ inch chrome plated steel media balls are added to a Spex 8006 Sample Prep Vial and Spex milled for 3 minutes. 3.92 grams Fe oxalate, 2.57 grams $NH_4H_2PO_4$, 0.835 grams $Li_2CO_3$, 0.105 grams $NH_4VO_3$, and 0.33 grams glucose are added to vial with rosin pre-coated media and spex milled for 30 minutes. Following milling it was observed that the media and Spex vial walls were practically free of powder coating and the milled powder had a fine dry free flowing consistency resembling talcum powder. 5 grams of the powder was pelletized in a 1 inch diameter pellet die using 11 tons pressure. The pellet was calcined in a tube furnace under argon atmosphere using a heating ramp of RT to 380° C. at 5° C./min, hold at 380° C. for 5 hours, heat from 380° C. to 475° C. at 5 C/min, hold at 475° C. for 5 hours, heat from 475° C. to 700° C. at 5° C./min, hold at 700° C. for 10 hours then natural cooldown. The calcined pellet was then powdered using a Spex mill and 3 chrome plated steel media balls for 5 minutes. The powder color was uniform black. The XRD pattern was obtained by coating the powder onto a zero-diffraction silicon plate and collecting the XRD data using a Shimadzu Lab-X XRD 6000. The XRD pattern is shown in FIG. 4 (top) and matches the crystal pattern for $LiFePO_4$.

A cathode slurry was prepared by mixing 80/10/10 $LiFePO_4$/Acetylene Black/Kureha 1120 PVDF binder by weight with N-methyl 2-pyrrolidone solvent using a Thinky mixer. The slurry solids is 40 wt %. A cathode sheet is prepared by drawdown bar coating 10 mils of the slurry onto 19 μm Al foil of slurry followed by drying in air at 130° C. for 30 minutes. The cathode sheet is pressed at 100 psi thrice. The LiFePO4 coating weight is 2.3 mg/cm$^2$ and the coating density is 1.38 g/cc.

CR2025 coin cell Li half cells are constructed with ⅝ in diameter cathode, Celgard 2325 separator, 1M LiPF6 EC/EMC/DMC 1/1 (1% VC) electrolyte and ⅝ in 13 mil thick Li foil anode. The cell is charged at a rate of C/20 to 4.1V then discharged to 3.0V. The cell had a C/20 discharge voltage of 3.4V and a C/20 and 1C capacity of 130 and 112 mAh/g respectively.

Example 5—$LiMn_{1.5}Ni_{0.5}O_4$ Produced with Gum Rosin Milling Additive in Spex Mill 0.4 grams of gum rosin (Aldrich 60895) and 20 grams of ¼ inch chrome plated steel media balls are added to a Spex 8006 Sample Prep Vial and Spex milled for 3 minutes. 6.37 grams $MnO_2$, 1.82 grams NiO, and 1.81 grams $Li_2CO_3$ are added to vial and milled for 20 minutes. Following milling it was observed that the media and Spex vial walls were practically free of powder coating and the milled powder had a fine dry free flowing consistency resembling talcum powder.

5 grams of the powder was pelletized in a 1 inch diameter pellet die using 11 tons pressure. The pellet was heated in air using a thermal ramp of room temperature to 360° C. at 10° C./min and holding at 360° C. for 2 hours, 360° C. to 550° C. at 10° C./min and holding at 550° C. for 2 hours, 550° C. to 900° C. at 5° C./min and holding at 900° C. for 12 hours followed by natural cooldown.

The pellet is then powderized by Spex milling with 3 chrome plated ¼ in steel balls for 5 minutes. The powder is then heated in air using a thermal ramp of room temperature to 700° C. at 5° C./min then holding at 700° C. for 48 hours followed by natural cooldown. The $LiMn_{1.5}Ni_{0.5}O_4$ powder is then Spex milled for 2 minutes with 3 chrome plated ¼ in steel balls.

A cathode slurry was prepared by mixing 80/5/10 $LiMn_{1.5}Ni_{0.5}O_4$/Acetylene Black/Kureha 1120 PVDF binder by weight with N-methyl 2-pyrrolidone solvent using a Thinky mixer. The slurry solids is 40 wt %. A cathode sheet is prepared by drawdown bar coating 12 mils of the slurry onto 19 μm Al foil of slurry followed by drying in air at 130° C. for 30 minutes. The cathode sheet is pressed at 25 psi. The active coating weight is 8.9 mg/cm$^2$ and the coating density is 2.2 g/cc.

CR2025 coin cell Li half cells are constructed with ⅝ in diameter cathode, Celgard 2325 separator, 1M $LiPF_6$ EC/DMC 3/7 (2% Lithium difluoro(oxalato)borate) electrolyte, and ⅝ in 13 mil thick Li foil anode. The cell is charged at a rate of C/20 to 5V then discharged to 3.1V. The cell had a C/20 discharge voltage of 4.7-4.8V, a C/20 and 1C capacity of 128 and 123 mAh/g respectively and a 1 cycle efficiency of 73%.

Example 6—$LiMn_{1.5}Ni_{0.5}O_4$ Produced with Abietic Acid Milling Additive in Spex Mill 0.4 grams of Abietic Acid and 20 grams of ¼ inch chrome plated steel media balls are added to a Spex 8006 Sample Prep Vial and Spex milled for 3 minutes. 6.37 grams $MnO_2$, 1.82 grams NiO, and 1.81 grams $Li_2CO_3$ are added to vial and milled for 20 minutes. Following milling it was observed that the media and Spex vial walls were practically free of powder coating and the milled powder had a fine dry free flowing consistency resembling talcum powder.

5 grams of the powder was pelletized in a 1 inch diameter pellet die using 11 tons pressure. The pellet was heated in air using a thermal ramp of room temperature to 360° C. at 10° C./min and holding at 360° C. for 2 hours, 360° C. to 550° C. at 10° C./min and holding at 550° C. for 2 hours, 550° C. to 900° C. at 5° C./min and holding at 900° C. for 12 hours followed by natural cooldown. The pellet is then powderized by Spex milling with 3 chrome plated ¼ in steel balls for 5 minutes. The powder is then heated in air using a thermal ramp of room temperature to 700° C. at 5° C./min then holding at 700° C. for 48 hours followed by natural cooldown. The $LiMn_{1.5}Ni_{0.5}O_4$ powder is then spex milled for 2 minutes with 3 chrome plated ¼ in steel balls.

A cathode slurry was prepared by mixing 80/5/10 $LiMn_{1.5}Ni_{0.5}O_4$/Acetylene Black/Kureha 1120 PVDF binder by weight with N-methyl 2-pyrrolidone solvent using a Thinky mixer. The slurry solids is 40 wt %. A cathode sheet is prepared by drawdown bar coating 10 mils of the slurry onto 19 μm Al foil of slurry followed by drying in air at 130° C. for 30 minutes. The cathode sheet is pressed at 20 psi. The active coating weight is 9 mg/cm$^2$ and the coating density is 2.1 g/cc.

CR2025 coin cell Li half cells are constructed with ⅝ in diameter cathode, Celgard 2325 separator, 1M $LiPF_6$ EC/DMC 3/7 (2% Lithium difluoro(oxalato)borate) electrolyte, and ⅝ in 13 mil thick Li foil anode. The cell is charged at a rate of C/20 to 5V then discharged to 3.1V. The cell had a C/20 discharge voltage of 4.7-4.8V, a C/20 and 1C capacity of 130 and 121 mAh/g respectively and a 1 cycle efficiency of 80%.

Example 7—$LiMn_{1.5}Ni_{0.5}O_4$ Produced with Foral AX Milling Additive in Spex Mill 0.4 grams of Foral AX (Pinova Inc.) and 20 grams of ¼ inch chrome plated steel media balls are added to a Spex 8006 Sample Prep Vial and Spex milled for 3 minutes. 6.37 grams $MnO_2$, 1.82 grams NiO, and 1.81 grams $Li_2CO_3$ are added to vial and milled for 20 minutes. Following milling it was observed that the media and Spex vial walls were practically free of powder coating and the milled powder had a fine dry free flowing consistency resembling talcum powder.

5 grams of the powder was pelletized in a 1 inch diameter pellet die using 11 tons pressure. The pellet was heated in air using a thermal ramp of room temperature to 360° C. at 10° C./min and holding at 360° C. for 2 hours, 360° C. to 550° C. at 10° C./min and holding at 550° C. for 2 hours, 550° C. to 900° C. at 5° C./min and holding at 900° C. for 12 hours followed by natural cooldown. The pellet is then powderized by Spex milling with 3 chrome plated ¼ in steel balls for 5 minutes. The powder is then heated in air using a thermal ramp of room temperature to 700° C. at 5° C./min then holding at 700° C. for 48 hours followed by natural cooldown. The $LiMn_{1.5}Ni_{0.5}O_4$ powder is then Spex milled for 2 minutes with 3 chrome plated ¼ in steel balls.

A cathode slurry was prepared by mixing 80/5/10 $LiMn_{1.5}Ni_{0.5}O_{4/}$/Acetylene Black/Kureha 1120 PVDF binder by weight with N-methyl 2-pyrrolidone solvent using a Thinky mixer. The slurry solids is 40 wt %. A cathode sheet is prepared by drawdown bar coating 10 mils of the slurry onto 19 μm Al foil of slurry followed by drying in air at 130° C. for 30 minutes. The cathode sheet is pressed at 20 psi. The active coating weight is 10.5 mg/cm$^2$ and the coating density is 2.1 g/cc.

CR2025 coin cell Li half cells are constructed with ⅝ in diameter cathode, Celgard 2325 separator, 1M $LiPF_6$ EC/DMC 3/7 (2% Lithium difluoro(oxalato)borate) electrolyte, and ⅝ in 13 mil thick Li foil anode. The cell is charged at a rate of C/20 to 5V then discharged to 3.1V. The cell had a C/20 discharge voltage of 4.7-4.8V, a C/20 and 1C capacity of 129 and 123 mAh/g respectively and a 1 cycle efficiency of 80%.

Example 8—$LiMn_{1.5}Ni_{0.5}O_4$ Produced with Pentalyn H Milling Additive in Spex Mill 0.4 grams of Pentalyn H (Pinova Inc.) and 20 grams of ¼ inch chrome plated steel media balls are added to a Spex 8006 Sample Prep Vial and Spex milled for 3 minutes. 6.37 grams $MnO_2$, 1.82 grams NiO, and 1.81 grams $Li_2CO_3$ are added to vial and milled for 20 minutes. Following milling it was observed that the media and Spex vial walls were practically free of powder coating and the milled powder had a fine dry free flowing consistency resembling talcum powder.

5 grams of the powder was pelletized in a 1 inch diameter pellet die using 11 tons pressure. The pellet was heated in air using a thermal ramp of room temperature to 360° C. at 10° C./min and holding at 360° C. for 2 hours, 360° C. to 550° C. at 10° C./min and holding at 550° C. for 2 hours, 550° C. to 900° C. at 5° C./min and holding at 900° C. for 12 hours followed by natural cooldown. The pellet is then powderized by Spex milling with 3 chrome plated ¼ in steel balls for 5 minutes. The powder is then heated in air using a thermal ramp of room temperature to 700° C. at 5° C./min then holding at 700° C. for 48 hours followed by natural cooldown. The $LiMn_{1.5}Ni_{0.5}O_4$ powder is then Spex milled for 2 minutes with 3 chrome plated ¼ in steel balls.

A cathode slurry was prepared by mixing 80/5/10 $LiMn_{1.5}Ni_{0.5}O_4$/Acetylene Black/Kureha 1120 PVDF binder by weight with N-methyl 2-pyrrolidone solvent using a Thinky mixer. The slurry solids is 40 wt %. A cathode sheet is prepared by drawdown bar coating 10 mils of the slurry onto 19 μm Al foil of slurry followed by drying in air at 130° C. for 30 minutes. The cathode sheet is pressed at 20 psi. The active coating weight is 9 mg/cm$^2$ and the coating density is 2.2 g/cc.

CR2025 coin cell Li half cells are constructed with ⅝ in diameter cathode, Celgard 2325 separator, 1M $LiPF_6$ EC/DMC 3/7 (2% Lithium difluoro(oxalato)borate) electrolyte, and ⅝ in 13 mil thick Li foil anode. The cell is charged at a rate of C/20 then discharged. The cell had a C/20 discharge voltage of 4.7-4.8V, a C/20 and 1C capacity of 124 and 122 mAh/g respectively and a $1^{st}$ cycle efficiency of 78%.

Example 9—$LiMn_{1.5}Ni_{0.5}O_4$ Produced with Foral 85 Milling Additive in Spex Mill 0.4 grams of Foral 85 (Pinova Inc.) and 20 grams of ¼ inch chrome plated steel media balls are added to a Spex 8006 Sample Prep Vial and Spex milled for 3 minutes. 6.37 grams $MnO_2$, 1.82 grams NiO, and 1.81 grams $Li_2CO_3$ are added to vial and milled for 20 minutes. Following milling it was observed that the media and Spex vial walls were practically free of powder coating and the milled powder had a fine dry free flowing consistency resembling talcum powder.

5 grams of the powder was pelletized in a 1 inch diameter pellet die using 11 tons pressure. The pellet was heated in air using a thermal ramp of room temperature to 360° C. at 10° C./min and holding at 360° C. for 2 hours, 360° C. to 550° C. at 10° C./min and holding at 550° C. for 2 hours, 550° C. to 900° C. at 5° C./min and holding at 900° C. for 12 hours followed by natural cooldown. The pellet is then powderized by Spex milling with 3 chrome plated ¼ in steel balls for 5 minutes. The powder is then heated in air using a thermal ramp of room temperature to 700° C. at 5° C./min then holding at 700° C. for 48 hours followed by natural cooldown. The $LiMn_{1.5}Ni_{0.5}O_4$ powder is then Spex milled for 2 minutes with 3 chrome plated ¼ in steel balls.

A cathode slurry was prepared by mixing 80/5/10 $LiMn_{1.5}Ni_{0.5}O_4$/Acetylene Black/Kureha 1120 PVDF binder by weight with N-methyl 2-pyrrolidone solvent using a Thinky mixer. The slurry solids is 40 wt %. A cathode sheet is prepared by drawdown bar coating 10 mils of the slurry onto 19 μm Al foil of slurry followed by drying in air at 130° C. for 30 minutes. The cathode sheet is pressed at 25 psi. The active coating weight is 8.9 mg/cm$^2$ and the coating density is 2.2 g/cc.

CR2025 coin cell Li half cells are constructed with ⅝ in diameter cathode, Celgard 2325 separator, 1M $LiPF_6$ EC/DMC 3/7 (2% Lithium difluoro(oxalato)borate) electrolyte, and ⅝ in 13 mil thick Li foil anode. The cell is charged at a rate of C/20 then discharged. The cell had a C/20 discharge voltage of 4.7-4.8V, a C/20 and 1C capacity of 128 and 126 mAh/g respectively and a $1^{st}$ cycle efficiency of 82%.

Example 10—$LiFePO_4$ (3% V) Produced with Ammoniated Gum Rosin Milling Additive in Spex Mill 1 gram of gum rosin (Aldrich 60895) plus 4 grams of 2M $NH_3$ (ethanol) are added to 30 ml ethanol and stirred at room temperature for 24 hours. The solution is evaporated at 80° C. for 1 hour. The dry ammoniated gum rosin is amber colored.

Figure 7:
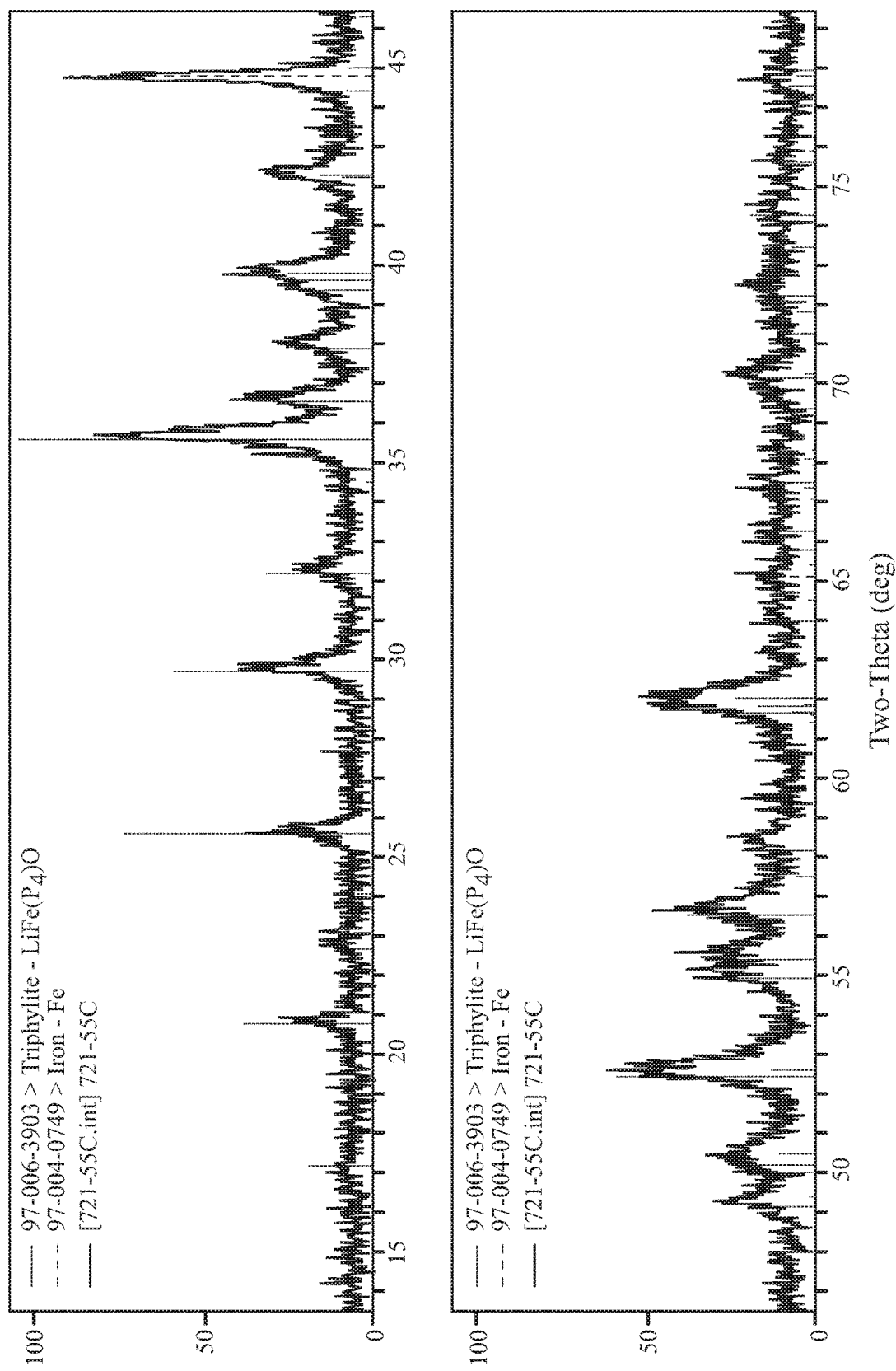
FIG. 7 is a powder XRD Pattern of $LiFePO_4$ produced using ammoniated gum rosin.

0.4 grams of ammoniated gum rosin and 20 grams of ¼ inch chrome plated steel media balls are added to a Spex 8006 Sample Prep Vial and Spex milled for 3 minutes. 3.92 grams Fe oxalate, 2.57 grams $NH_4H_2PO_4$, 0.835 grams $Li_2CO_3$, 0.105 grams $NH_4VO_3$, and 0.33 grams glucose are added to vial with rosin pre-coated media and Spex milled for 30 minutes. Following milling it was observed that the media and Spex vial walls were practically free of powder coating and the milled powder had a fine dry free flowing consistency resembling talcum powder. 5 grams of the powder was pelletized in a 1 inch diameter pellet die using 11 tons pressure. The pellet was calcined in a tube furnace under argon atmosphere using a heating ramp of RT to 380° C. at 5° C./min, hold at 380° C. for 5 hours, heat from 380° C. to 475° C. at 5° C./min, hold at 475° C. for 5 hours, heat from 475° C. to 700° C. at 5° C./min, hold at 700° C. for 10 hours then natural cooldown. The calcined pellet was then powdered using a Spex mill and 3 chrome plated steel media balls for 5 minutes. The powder color was uniform black. The XRD pattern was obtained by coating the powder onto a zero-diffraction silicon plate and collecting the XRD data using a Shimadzu Lab-X XRD 6000. The XRD pattern is shown in FIG. 7 and matches the crystal pattern for $LiFePO_4$ along with a Fe impurity.

A cathode slurry was prepared by mixing 80/10/10 $LiFePO_4$/Acetylene Black/Kureha 1120 PVDF binder by weight with N-methyl 2-pyrrolidone solvent using a Thinky mixer. The slurry solids is 40 wt %. A cathode sheet is prepared by drawdown bar coating 10 mils of the slurry onto 19 μm Al foil of slurry followed by drying in air at 130° C. for 30 minutes. The cathode sheet is pressed at 100 psi thrice. The $LiFePO_4$ coating weight is 2.3 mg/cm$^2$ and the coating density is 1.38 g/cc.

CR2025 coin cell Li half cells are constructed with ⅝ in diameter cathode, Celgard 2325 separator, 1M $LiPF_6$ EC/EMC/DMC 1/1 (1% VC) electrolyte and ⅝ in 13 mil thick Li foil anode. The cell is charged at a rate of C/20 to 4.1V then discharged to 3.0V. The cell had a C/20 discharge voltage of 3.4V and a C/20 and 1C capacity of 132 and 103 mAh/g respectively.

Example 11—Titanium Niobium Oxide (TNO) Produced with Gum Rosin Additive in Spex Mill 0.3 grams of gum rosin (Aldrich 60895) and 20 grams of ¼ inch chrome plated steel media balls are added to a Spex 8006 Sample Prep Vial and Spex milled for 3 minutes. 3 grams of nanopowder $Nb_2O_5$ (SkySpring Nanomaterials Inc.) and 0.9 grams of nanopowder rutile $TiO_2$ (SkySpring Nanomaterials Inc.) are added to vial and Spex milled for 30 minutes. Following milling it was observed that the media and Spex vial walls were practically free of powder coating and the milled powder had a fine dry free flowing consistency resembling talcum powder.

Figure 8:
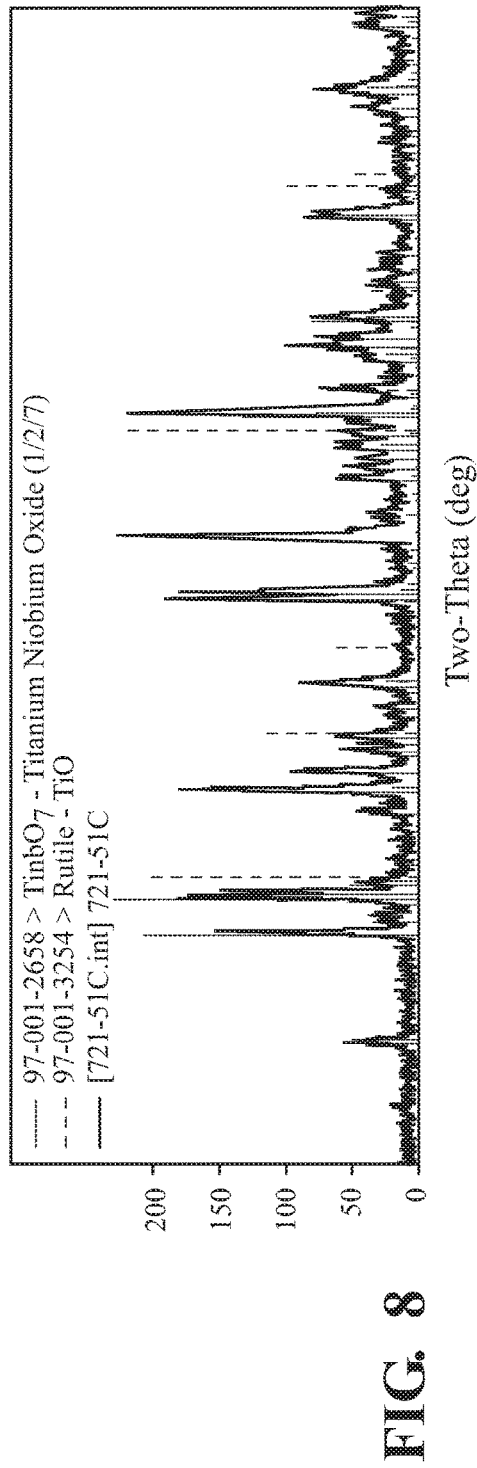
FIG. 8 is a powder XRD pattern of titanium niobium oxide produced with gum rosin anti-caking additive in a Spex Mill showing no $TiO_2$ impurities.

5 grams of the powder was pelletized in a 1 inch diameter pellet die using 11 tons pressure. The pellet was heated in air using a thermal ramp of room temperature to 360° C. at 10° C./min and holding at 360° C. for 2 hours, 360° C. to 550° C. at 10° C./min and holding at 550° C. for 2 hours, 550° C. to 1000° C. and holding at 1000° C. for 10 hours. The TNO powder is then Spex milled for 2 minutes with 3 chrome plated ¼ in steel balls. The powder color was créme white. The XRD pattern was obtained by coating the powder onto a zero-diffraction silicon plate and collecting the XRD data using a Shimadzu Lab-X XRD 6000. The XRD pattern is shown in FIG. 8 and matches the crystal pattern for Titanium Niobium Oxide with no $TiO_2$ impurities.

A cathode slurry was prepared by mixing 90/3/7 TNO/Acetylene Black/Solvay 5130 PVDF binder by weight with N-methyl 2-pyrrolidone solvent using a Thinky mixer. The slurry solids is 50 wt %. A cathode sheet is prepared by drawdown bar coating 8 mils of the slurry onto 19 μm Al foil of slurry followed by drying in air at 130° C. for 30 minutes. The cathode sheet is pressed at 10 psi. The TNO coating weight is 9.3 mg/cm$^2$ and the coating density is 1.4 g/cc.

Figure 9:
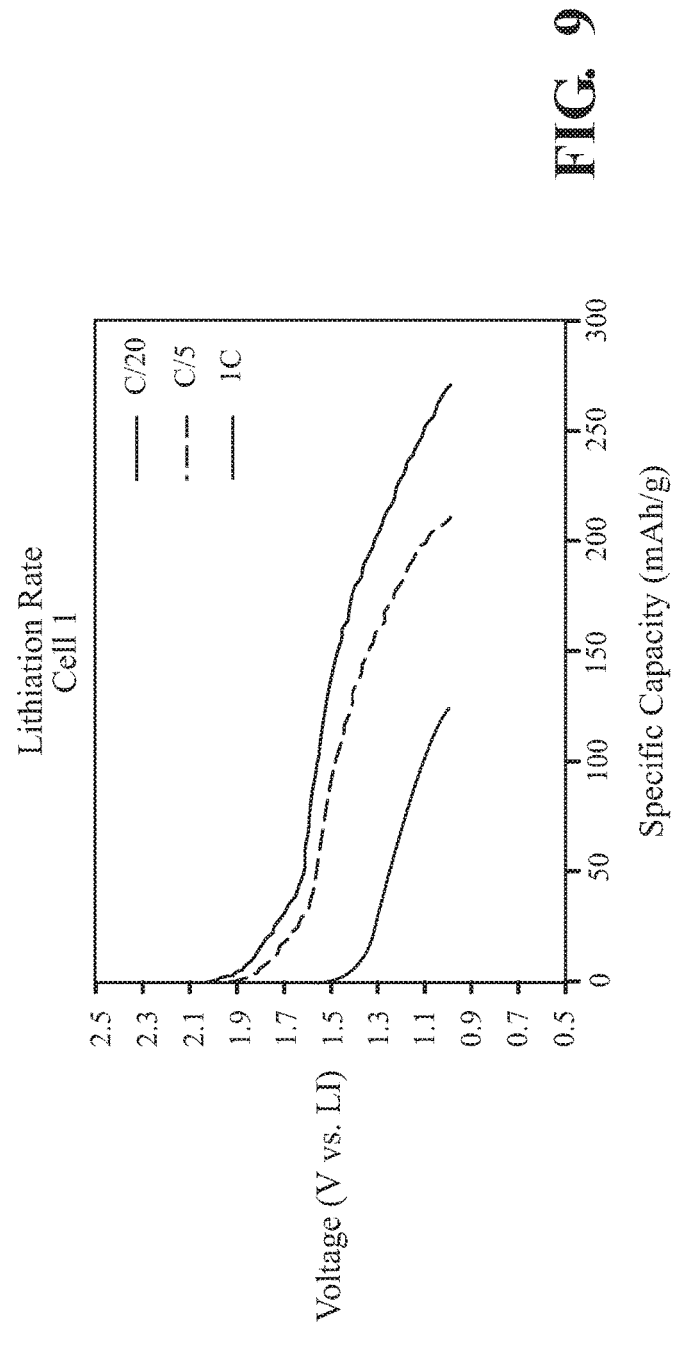
FIG. 9 illustrates lithiation of TNO at various rates produced by Spex milling precursors with gum rosin.

CR2025 coin cell Li half cells are constructed with ⅝ in diameter cathode, Celgard 2325 separator, 1M $LiPF_6$ EC/EMC/DMC 1/1/1 (1% VC) electrolyte and ⅝ in 13 mil thick Li foil anode. The cell is discharged to 1.0V. The cell had a C/20 and 1C discharge capacity of 275 and 125 mAh/g respectively. The discharge plots are shown in FIG. 9.

Example 12—Titanium Niobium Oxide (TNO) Produced with 7.1% Stearic Acid Additive in Spex Mill 0.3 grams of stearic acid and 20 grams of ¼ inch chrome plated steel media balls are added to a Spex 8006 Sample Prep Vial and Spex milled for 3 minutes. 3 grams of nanopowder $Nb_2O_5$ (SkySpring Nanomaterials Inc.) and 0.9 grams of nanopowder rutile $TiO_2$ (SkySpring Nanomaterials Inc.) are added to vial and Spex milled for 30 minutes. Following milling it was observed that the media and Spex vial walls were free of powder coating and the milled powder had a fine dry free flowing consistency resembling talcum powder.

5 grams of the powder was pelletized in a 1 inch diameter pellet die using 11 tons pressure. The pellet was heated in air using a thermal ramp of room temperature to 360° C. at 10° C./min and holding at 360° C. for 2 hours, 360° C. to 550° C. at 10° C./min and holding at 550° C. for 2 hours, 550° C. to 1000° C. and holding at 1000° C. for 10 hours. The TNO powder is then Spex milled for 2 minutes with 3 chrome plated ¼ in steel balls.

A cathode slurry was prepared by mixing 90/3/7 wt % TNO/Acetylene Black/Solvay 5130 PVDF binder by weight with N-methyl 2-pyrrolidone solvent using a Thinky mixer. The slurry solids is 50 wt %. A cathode sheet is prepared by drawdown bar coating 8 mils of the slurry onto 19 μm Al foil of slurry followed by drying in air at 130° C. for 30 minutes. The cathode sheet is pressed at 10 psi. The TNO coating weight is 8.2 mg/cm$^2$ and the coating density is 1.5 g/cc.

CR2025 coin cell Li half cells are constructed with ⅝ in diameter cathode, Celgard 2325 separator, 1M $LiPF_6$ EC/EMC/DMC 1/1/1 (1% VC) electrolyte and ⅝ in 13 mil thick Li foil anode. The cell is discharged to 1.0V. The cell had a C/20 and 1C discharge capacity of 281 and 121 mAh/g respectively and a 1 cycle efficiency of 90%.

Example 13—$LiFePO_4$ Precursor Produced with Gum Rosin Milling Additive in Spex Mill 0.3 grams of gum rosin (Aldrich 60895) and 19.826 grams of ¼ inch chrome plated steel media balls are added to a Spex 8006 Sample Prep Vial and Spex milled for 3 minutes. 3.92 grams Ferrous oxalate, 2.57 grams $NH_4H_2PO_4$, 0.835 grams $Li_2CO_3$, and 0.33 grams glucose are added to vial with rosin pre-coated media and Spex milled for 30 minutes. Following milling there was 0.42 grams of precursor adhered onto the vial walls and 0.08 grams adhered onto the media.

Example 14—$LiCo_{0.85}Fe_{0.15}PO_4$ Precursor Produced with Gum Rosin Milling Additive in Spex Mill 0.3 grams of gum rosin (Aldrich 60895) and 19.826 grams of ¼ inch chrome plated steel media balls are added to a Spex 8006 Sample Prep Vial and Spex milled for 3 minutes. 4.83 grams of lithium monohydrogen phosphate, 3.62 grams of $Co(OH)_2$, 0.81 grams Ferrous oxalate and 0.36 grams of acetylene black are added to vial with rosin pre-coated media and Spex milled for 30 minutes. Following milling there was 0.12 grams of precursor adhered onto the vial walls and 0.02 grams adhered onto the media.

Figure 5:
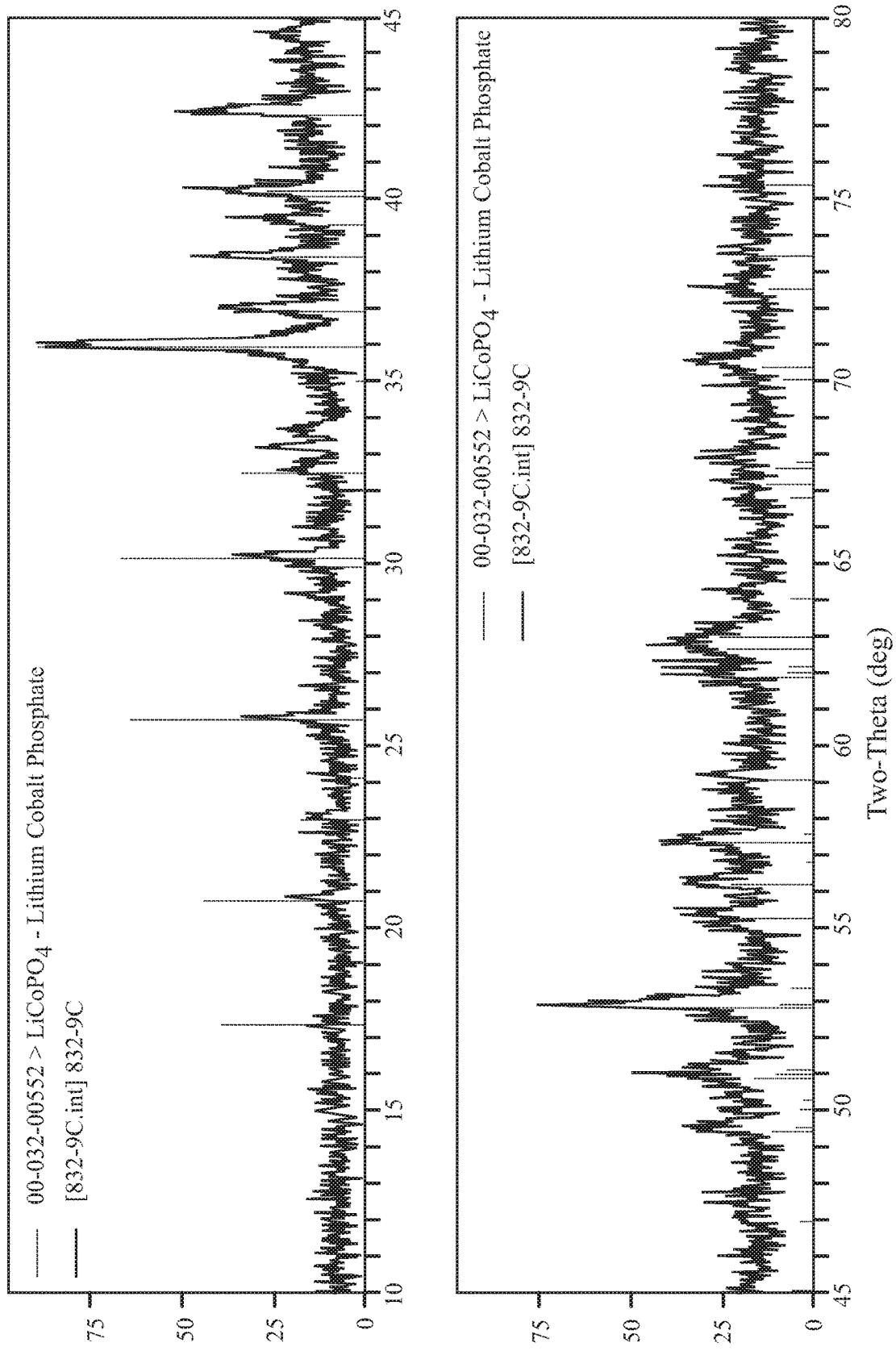
FIG. 5 is a powder XRD Pattern of $LiCo_{0.85}Fe_{0.15}PO_4$ produced in Jar Mill without anti-caking additive.

Comparative Example 1—$LiCo_{0.85}Fe_{0.15}PO_4$ Produced without Milling Additive in Jar Mill 9.65 grams of $LiH_2PO_4$, 7.23 grams of $Co(OH)_2$, 1.613 grams of Iron(2) oxalate, 0.34 grams of $Cr_2O_3$ and 0.73 grams of acetylene black are added to a 000 porcelain jar mill with 300 grams of zirconia media and milled for 90 minutes. Following milling it was observed that the media and jar walls were caked with powder. The powder was pelletized in a 1 inch diameter pellet die using 11 tons pressure. The pellet was calcined in a tube furnace under argon atmosphere by heating from room temperature to 700° C. at 10° C./min and holding at 700° C. for 12 hours followed by natural cool down. The calcined pellet was then powdered using a Spex mill and 3 media balls for 5 minutes. The XRD pattern was obtained by coating the powder onto a zero-diffraction silicon plate and collecting the XRD data using a Shimadzu Lab-X XRD 6000. The XRD pattern is shown in FIG. 5 and matches the crystal pattern for $LiCoPO_4$.

A cathode slurry was prepared by mixing 85/5/10 wt % $LiCoFePO_4$/Acetylene Black/Kureha 1120 PVDF binder by weight with N-methyl 2-pyrrolidone solvent using a Thinky mixer. The slurry solids is 39 wt %. A cathode sheet is prepared by drawdown bar coating 12 mils of the slurry onto 19 μm Al foil of slurry followed by drying in air at 130° C. for 30 minutes. The cathode sheet is pressed at 50 psi twice. The $LiCo_{0.85}Fe_{0.15}PO_4$ active coating weight is 9.2 mg/cm$^2$ and the coating density is 2.1 g/cc.

CR2025 coin cell Li half cells are constructed with ⅝ in diameter cathode, Celgard 2325 separator, 1M $LiPF_6$ EC/DMC 3/7 (2% Lithium difluoro(oxalato)borate) electrolyte, and ⅝ in 13 mil thick Li foil anode. The cell is charged at a rate of C/20 then discharged. The cell had a C/20 discharge voltage of 4.7-4.8V, a C/20 and 1C capacity of 41 and 25 mAh/g respectively and a $1^{st}$ cycle efficiency of 42%. The capacity and $1^{st}$ cycle efficiency is lower than the LiCoFePO$_4$ examples that uses rosin milling additive.

Figure 3:
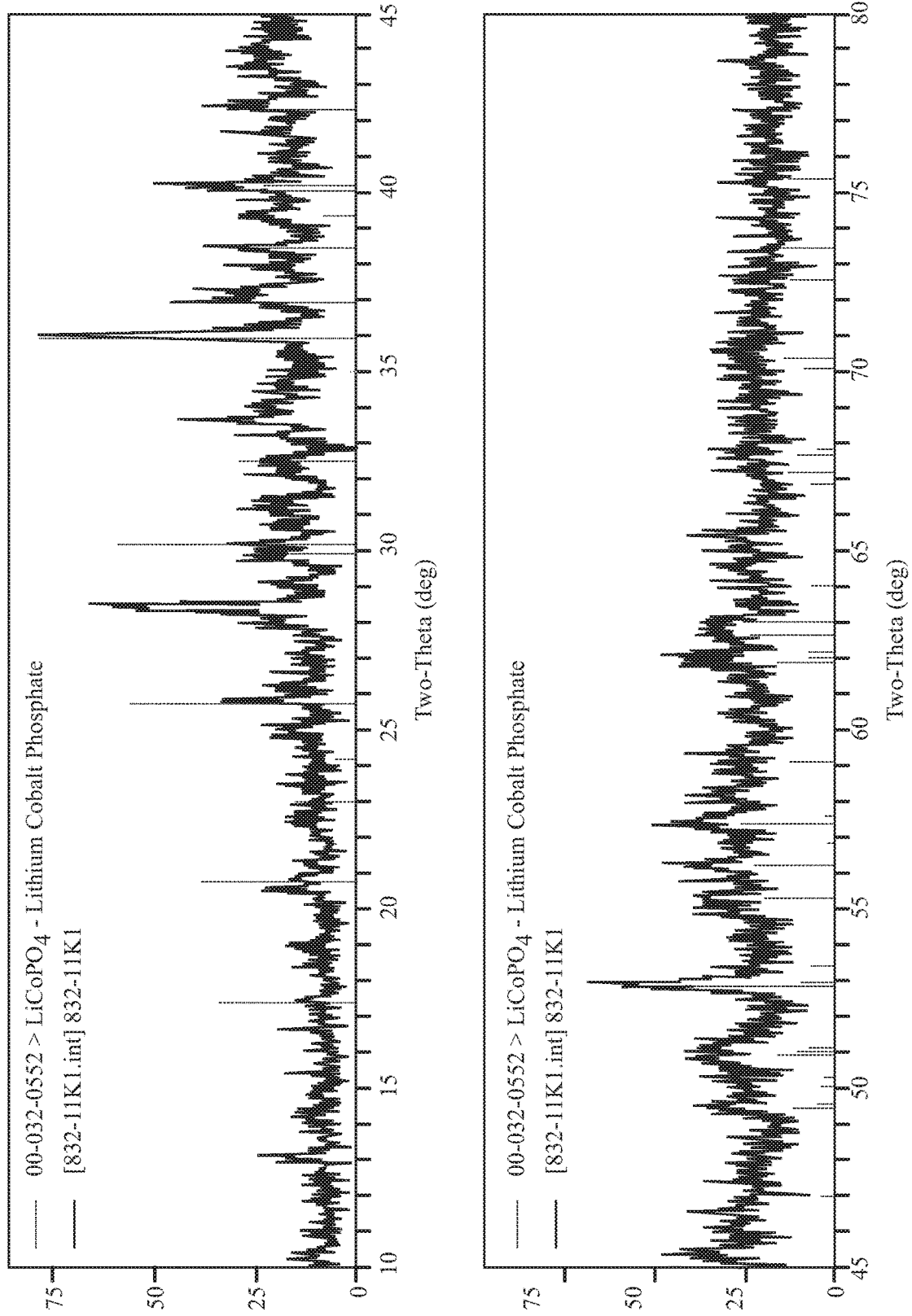
FIG. 3 is a powder XRD Pattern of $LiCo_{0.85}Fe_{0.15}PO_4$ produced without gum rosin anti-caking additive in Spex mill.

Comparative Example 2—LiCo$_{0.85}$Fe$_{0.15}$PO$_4$ Produced without Milling Additive in Spex Mill and Split Calcination 20 grams of ¼ inch chrome plated steel media balls are added to a Spex 8006 Sample Prep Vial with 4.83 grams of LiH$_2$PO$_4$, 3.62 grams of Co(OH)$_2$, 0.81 grams of Iron(2) oxalate, 0.17 grams of Cr$_2$O$_3$ and 0.36 grams of acetylene black and Spex milled for 20 minutes. Following milling it was observed that the media and Spex vial walls were caked with powder. 5 grams of the powder was pelletized in a 1 inch diameter pellet die using 11 tons pressure. The pellet was calcined in a tube furnace under argon atmosphere by heating from room temperature to 750° C. at 10° C./min and holding at 750° C. for 12 hours followed by natural cool down. The calcined pellet was then powdered using a Spex mill and 3 chrome plated steel media balls for 5 minutes. The powder color was uniform black, and the powder was not magnetic. The X-Ray Powder Diffraction (XRD) pattern was obtained by coating the powder onto a zero-diffraction silicon plate and collecting the XRD data using a Shimadzu Lab-X XRD 6000. The XRD pattern is shown in FIG. 3 and is less crystalline than Example 2 and does not exactly match the crystalline pattern for LiCoPO$_4$.

A cathode slurry was prepared by mixing 85/5/10 wt % LiCo$_{0.85}$Fe$_{0.15}$PO$_4$ Acetylene Black/Kureha 1120 PVDF binder by weight with N-methyl 2-pyrrolidone solvent using a Thinky mixer. The slurry solids is 39 wt/o. A cathode sheet is prepared by drawdown bar coating 12 mils of the slurry onto 19 μm Al foil of slurry followed by drying in air at 130° C. for 30 minutes. The cathode sheet is pressed at 25 psi 5 times. The LiCo$_{0.85}$Fe$_{0.15}$PO$_4$ active coating weight is 8.6 mg/cm$^2$ and the coating density is 2.8 g/cc.

CR2025 coin cell Li half cells are constructed with ⅝ in diameter cathode, Celgard 2325 separator, 1M LiPF$_6$ EC/DMC 3/7 (2% Lithium difluoro(oxalato)borate) electrolyte, and ⅝ in 13 mil thick Li foil anode. The cell is charged at a rate of C/20 to 5V then discharged to 3.1V. The cell had a C/20 discharge voltage of less than 4.8V, a C/20 and 1C capacity of 7 and 3 mAh/g and a $1^{st}$ cycle efficiency of 30%. The capacity and $1^{st}$ cycle efficiency is much lower than the LiCo$_{0.85}$Fe$_{0.15}$PO$_4$ examples that uses rosin milling additive.

Comparative Example 3—LiFePO$_4$ (3% V) Produced without Milling Additive in Spex Mill 0.4 grams of gum rosin (Aldrich 60895) and 20 grams of ¼ inch chrome plated steel media balls are added to a Spex 8006 Sample Prep Vial and Spex milled for 3 minutes. 3.92 grams Fe oxalate, 2.57 grams NH$_4$H$_2$PO$_4$, 0.835 grams Li$_2$CO$_3$, 0.105 grams NH$_4$VO$_3$, and 0.33 grams glucose are added to vial with rosin pre-coated media and Spex milled for 30 minutes. Following milling it was observed that the media and Spex vial walls were coated with powder and most of the powder was compressed into a hard-packed bed with the vial. The powder was pelletized in a 1 inch diameter pellet die using 11 tons pressure. The pellet was calcined in a tube furnace under argon atmosphere using a heating ramp of RT to 380° C. at 5° C./min, hold at 380° C. for 5 hours, heat from 380° C. to 475° C. at 5° C./min, hold at 475° C. for 5 hours, heat from 475° C. to 700° C. at 5° C./min, hold at 700° C. for 10 hours then natural cooldown. The calcined pellet was then powdered using a Spex mill and 3 chrome plated steel media balls for 5 minutes. The powder color was uniform black. The XRD pattern was obtained by coating the powder onto a zero-diffraction silicon plate and collecting the XRD data using a Shimadzu Lab-X XRD 6000. The XRD pattern is shown in FIG. 2 (bottom) and matches the crystal pattern for LiFePO$_4$.

A cathode slurry was prepared by mixing 80/10/10 wt 5 LiFePO$_4$/Acetylene Black/Kureha 1120 PVDF binder by weight with N-methyl 2-pyrrolidone solvent using a Thinky mixer. The slurry solids is 40 wt %. A cathode sheet is prepared by drawdown bar coating 10 mils of the slurry onto 19 μm Al foil of slurry followed by drying in air at 130° C. for 30 minutes. The cathode sheet is pressed at 100 psi three times. The LiFePO$_4$ coating weight is 3.4 mg/cm$^2$ and the coating density is 1.0 g/cc.

CR2025 coin cell Li half cells are constructed with ⅝ in diameter cathode, Celgard 2325 separator and ⅝ in 13 mil thick Li foil anode. The cell is charged at a rate of C/20 then discharged. The cell had a C/20 discharge voltage of 3.4 V and a C/20 and 1C capacity of 127 and 91 respectively mAh/g. The capacity and rate capability are less than the LiFePO$_4$ examples that use gum rosin milling additive.

Comparative Example 4—LiMn$_{1.5}$Ni$_{0.5}$O$_4$ Produced without Milling Additive in Spex Mill 20 grams of ¼ inch chrome plated steel media balls are added to a Spex 8006 Sample Prep Vial. 6.37 grams MnO$_2$, 1.82 grams NiO, and 1.81 grams Li$_2$CO$_3$ are added to the vial and milled for 20 minutes. Following milling it was observed that the media and Spex vial walls were coated with caked powder and the remaining powder was partially caked and packed into a powder bed.

5 grams of the powder was pelletized in a 1 inch diameter pellet die using 11 tons pressure. The pellet was heated in air using a thermal ramp of room temperature to 360° C. at 10° C./min and holding at 360° C. for 2 hours, 360° C. to 550° C. at 10° C./min and holding at 550° C. for 2 hours, 550° C. to 900° C. at 5° C./min and holding at 900° C. for 12 hours followed by natural cooldown. The pellet is then powderized by Spex milling with 3 chrome plated 4 in steel balls for 5 minutes. The powder is then heated in air using a thermal ramp of room temperature to 700° C. at 5° C./min then holding at 700° C. for 48 hours followed by natural cooldown. The LiMn$_{1.5}$Ni$_{0.5}$O$_4$ powder is then Spex milled for 2 minutes with 3 chrome plated ¼ in steel balls.

A cathode slurry was prepared by mixing 80/5/10 wt % LiMn$_{1.5}$Ni$_{0.5}$O$_4$/Acetylene Black/Kureha 1120 PVDF binder by weight with N-methyl 2-pyrrolidone solvent using a Thinky mixer. The slurry solids is 40 wt %. A cathode sheet is prepared by drawdown bar coating 12 mils of the slurry onto 19 μm Al foil of slurry followed by drying in air at 130° C. for 30 minutes. The cathode sheet is pressed at 12 psi. The active coating weight is 9.1 mg/cm$^2$ and the coating density is 2.1 g/cc.

CR2025 coin cell Li half cells are constructed with ⅝ in diameter cathode, Celgard 2325 separator, 1M LiPF$_6$ EC/DMC 3/7 (2% Lithium difluoro(oxalato)borate) electrolyte, and ⅝ in 13 mil thick Li foil anode. The cell is charged at a rate of C/20 then discharged. The cell had a C/20 discharge voltage of 4.7-4.8V, a C/20 and 1C capacity of 128 and 111 mAh/g respectively and a $1^{st}$ cycle efficiency of 71%. The 1C capacity is lower than in the LiMn$_{1.5}$Ni$_{0.5}$O$_4$ examples that used a rosin milling additive.

Comparative Example 5—LiMn$_{1.5}$Ni$_{0.5}$O$_4$ Produced with Wet Solvent Milling in Jar Mill 300 grams of ¼ inch zirconia media is added to a 000 porcelain jar mill. 20 grams MnO$_2$, 5.73 grams NiO, 5.67 grams Li$_2$CO$_3$ and 34 grams of methyl ethyl ketone are added to the jar and roller milled for 18 hours. After milling the slurry is filtered to remove the media then oven dried at 80° C. to remove the solvent. The resulting powder is free flowing with the consistency of talcum powder.

The powder is pelletized into 1 inch diameter 5 gram pellets using 11 tons pressure. The pellets are fired in air using a heating schedule of room temperature to 900° C. at 10° C./min, holding at 900° C. for 12 hours, and cooldown under ambient conditions to room temperature. The pellet is then powderized by Spex milling with 3 chrome plated ¼ in steel balls for 5 minutes then heated in air using a heating schedule of room temperature to 700° C. at 10° C./min, holding at 700° C. for 48 hours then cooldown to room temperature under ambient conditions.

A cathode slurry was prepared by mixing 80/5/10 wt % LiMn$_{1.5}$Ni$_{0.5}$O$_4$/Acetylene Black/Kureha 1120 PVDF binder by weight with N-methyl 2-pyrrolidone solvent using a Thinky mixer. The slurry solids is 40 wt %. A cathode sheet is prepared by drawdown bar coating 10 mils of the slurry onto 19 μm Al foil of slurry followed by drying in air at 130° C. for 30 minutes. The cathode sheet is pressed at 50 psi. The active coating weight is 9.1 mg/cm$^2$ and the coating density is 2.1 g/cc.

CR2025 coin cell Li half cells are constructed with ⅝ in diameter cathode, Celgard 2325 separator, 1M LiPF$_6$ EC/DMC 3/7 (2% Lithium difluoro(oxalato)borate) electrolyte, and ⅝ in 13 mil thick Li foil anode. The cell is charged at a rate of C/20 then discharged. The cell had a C/20 discharge voltage of 4.7-4.8V, a C/20 and 1C capacity of 132 and 127 mAh/g respectively and a 1$^{st}$ cycle efficiency of 81%.

Comparative Example 6—LiCo$_{0.85}$Fe$_{0.15}$O$_4$ Produced Using Stearic Acid Milling Additive in Spex Mill 0.4 grams of stearic acid and 20 grams of ¼ inch chrome plated steel media balls are added to a Spex 8006 Sample Prep Vial and Spex milled for 3 minutes. The mill and media are dried at 90° C. for 1 hour. 4.83 grams of LiH$_2$PO$_4$, 3.62 grams of Co(OH)$_2$, 0.81 grams of Iron(2) oxalate, 0.17 grams of Cr$_2$O$_3$ and 0.36 grams of acetylene black are added to the vial and Spex milled for 20 minutes. Following milling it was observed that the media and Spex vial walls were caked with powder. The powder was pelletized in a 1 inch diameter pellet die using 11 tons pressure. The pellet was calcined in a tube furnace under argon atmosphere by heating from room temperature to 700° C. at 10° C./min and holding at 700° C. for 12 hours followed by natural cool down. The calcined pellet was then powdered using a Spex mill and 3 chrome plated steel media balls for 5 minutes. The powder color was uniform purple-grey and the powder was not magnetic. The X-Ray Powder Diffraction (XRD) pattern was obtained by coating the powder onto a zero-diffraction silicon plate and collecting the XRD data using a Shimadzu Lab-X XRD 6000. The XRD pattern is shown in FIG. 12.

A cathode slurry was prepared by mixing 85/10/5 LiCo$_{0.85}$Fe$_{0.15}$PO$_4$/Acetylene Black/Kureha 1120 PVDF binder by weight with N-methyl 2-pyrrolidone solvent using a Thinky mixer. The slurry solids is 39%. A cathode sheet is prepared by drawdown bar coating 12 mils of the slurry onto 19 μm Al foil of slurry followed by drying in air at 130° C. for 30 minutes. The cathode sheet is pressed at 50 psi twice. The LiCoFePO4 active coating weight is 5.7 mg/cm$^2$ and the coating density is 2.1 g/cc.

CR2025 coin cell Li half cells are constructed with ⅝ in diameter cathode, Celgard 2325 separator, 1M LiPF$_6$ EC/DMC 3/7 (2% Lithium difluoro(oxalato)borate) electrolyte, and ⅝ in 13 mil thick Li foil anode. The cell is charged at a rate of C/20 to 5V then discharged to 3.1V. The cell had a C/20 discharge voltage of 4.8-4.9V, a C/20 and 1C capacity of 106 and 91 mAh/g respectively and a 10 cycle efficiency of 64%. The capacity and 1$^{st}$ cycle efficiency is lower than in the example using gum rosin as an anti-caking additive.

Comparative Example 7—LiFePO$_4$ Precursor Produced without Milling Additive in Spex Mill 19.826 grams of ¼ inch chrome plated steel media balls, 3.92 grams Ferrous oxalate, 2.57 grams NH$_4$H$_2$PO$_4$, 0.835 grams Li$_2$CO$_3$, and 0.33 grams glucose are added to Spex vial and Spex milled for 30 minutes. Following milling there was 3.22 grams of precursor packed and adhered onto the vial walls and 0.3 grams adhered onto the media.

REFERENCE LIST

1. Fiebach, Klemens; Grimm, Dieter (2000). "Resins, Natural". Ullmann's Encyclopedia of Industrial Chemistry. doi:10.1002/14356007.a23_073. ISBN 978-3-527-30673-2.
2. Lars-Hugo Norlin "Tall Oil" in Ullmann's Encyclopedia of Industrial Chemistry 2002, Wiley-VCH, Weinheim. doi:10.1002/14356007.a26_057
3. U.S. Pat. No. 1,511,461 A
4. CN 107611366
5. Wang, Richards, Ong, Miara, Kim, Mo, Ceder, Design principles for solid-state lithium superionic conductors, Nature Materials, Published Online: 17 Aug. 2015|DOI: 10.1038/NMAT4369.

Various modifications of the present invention, in addition to those shown and described herein, will be apparent to those skilled in the art of the above description. Such modifications are also intended to fall within the scope of the appended claims.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

We claim:

1. A process of dry milling a chemical, the process comprising:
   adding a rosin or rosin derivative to a milling vessel in the absence of a particulate chemical, and milling the rosin or rosin derivative for a pre-milling time,
   after said pre-milling time, combining in the milling vessel the particulate chemical with the rosin or the rosin derivative to form a milling mixture, wherein the particulate chemical is an electrochemically active precursor,
   milling the milling mixture for a milling time to form a milled product, whereby the milling process is in the absence of added liquid, wherein the milled product is suitable for use as an electrochemically active material in an electrochemical cell.

2. The process of claim 1, wherein the rosin is a gum rosin or gum rosin derivative.

3. The process of claim 1, wherein the rosin comprises or consists of abietic acid or abietic acid derivative.

4. The process of claim 1, wherein the rosin or rosin derivative is: a hydrogenated rosin, an alkali rosinate or pinate soap wherein the alkali cation is ammonium, lithium, sodium, potassium, rubidium, or cesium; a gum rosin or gum rosin derivative, the gum rosin derivative selected from the group consisting of a hydrogenated gum rosin, esterified gum rosin; combination thereof.

5. The process of claim 1, wherein the rosin is a gum rosin salt of ammonium, lithium, sodium, potassium, rubidium or cesium; wherein the rosin is an abietic salt of ammonium, lithium, sodium, potassium, rubidium, or cesium; or wherein the rosin is an abietic acid derivative selected from the group consisting of hydrogenated abietic acid, esterified abietic acid, or a combination thereof.

6. The process of claim 1, wherein the milling vessel comprises stainless steel, hardened steel, tungsten carbide, agate, alumina, zirconia, or a combination thereof.

7. The process of claim 1, wherein the milling vessel comprises a milling media, the milling media comprising, stainless steel, hardened steel, tungsten carbide, agate, alumina, zirconium silicate, zirconia, or combinations thereof.

8. The process of claim 1, wherein the milling vessel is part of a mill, the mill is a rotating mill, shaker mill, a spex mill, planetary mill, jar mill, pebble mill, or stirred media mill.

9. The process of claim 1 wherein the electrochemically active precursor is selected from the group consisting of metal oxides, metal halides, metal fluorides, metal hydroxides, metal carbonates, metal hydroxide carbonates, metal sulfates, metal nitrates, metal borates, metal vanadates, metal zirconates, metal titanates, metal phosphates, metal chromates, metal oxalates, metal salts of carboxylic acids, organometallics, metal monohydrogen phosphates, metal dihydrogen phosphates, ammonium phosphate, ammonium monohydrogen phosphate, ammonium dihydrogen phosphate, lithium phosphate, lithium monohydrogen phosphate, lithium dihydrogen phosphate, non-metal phosphates, non-metal monohydrogen phosphates, non-metal dihydrogen phosphates, carbon, graphite, graphene, glucose, sucrose, maltose, and mixtures thereof.

10. The process of claim 1, further comprising calcining the milled product.

11. A process of dry milling a chemical, the process comprising:
adding a milling additive to a milling vessel in the absence of a particulate chemical and milling the milling additive for a pre-milling time;
after the pre-milling time, combing in the milling vessel the particulate chemical with the milling additive to form a milling mixture, the milling additive comprising abietic acid or abietic acid derivative, wherein the particulate chemical comprises an electrochemically active precursor and
milling the milling mixture for a milling time to form a milled product, whereby the milling process is in the absence of added liquid,
wherein the milled product is suitable for use as an electrochemically active material in an electrochemical cell.

12. The process of claim 11, wherein the milling additive is an abietic salt of ammonium, lithium, sodium, potassium, rubidium, or cesium, or wherein the milling additive comprises an abietic acid derivative selected from the group consisting of hydrogenated abietic acid, esterified abietic acid, or a combination thereof.

13. The process of claim 11, wherein the milling vessel comprises a milling media, the milling media comprising, stainless steel, hardened steel, tungsten carbide, agate, alumina, zirconium silicate, zirconia, or combinations thereof.

14. The process of claim 11 wherein the electrochemically active precursor is selected from the group consisting of metal oxides, metal halides, metal fluorides, metal hydroxides, metal carbonates, metal hydroxide carbonates, metal sulfates, metal nitrates, metal borates, metal vanadates, metal zirconates, metal titanates, metal phosphates, metal chromates, metal oxalates, metal salts of carboxylic acids, organometallics, metal monohydrogen phosphates, metal dihydrogen phosphates, ammonium phosphate, ammonium monohydrogen phosphate, ammonium dihydrogen phosphate, lithium phosphate, lithium monohydrogen phosphate, lithium dihydrogen phosphate, non-metal phosphates, non-metal monohydrogen phosphates, non-metal dihydrogen phosphates, carbon, graphite, graphene, glucose, sucrose, maltose, and mixtures thereof.

* * * * *